(12) United States Patent
Kim et al.

(10) Patent No.: US 9,930,511 B2
(45) Date of Patent: Mar. 27, 2018

(54) METHOD AND APPARATUS FOR FRIEND DISCOVERY

(71) Applicant: Samsung Electronics Co., Ltd., Gyeonggi-do (KR)

(72) Inventors: Jaehwan Kim, Gyeonggi-do (KR); Keumju Jang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/203,881

(22) Filed: Mar. 11, 2014

(65) Prior Publication Data

US 2014/0269657 A1 Sep. 18, 2014

(30) Foreign Application Priority Data

Mar. 14, 2013 (KR) .......................... 10-2013-0027594

(51) Int. Cl.
*H04W 8/00* (2009.01)
*H04W 4/02* (2018.01)
*H04W 4/08* (2009.01)

(52) U.S. Cl.
CPC ........... *H04W 8/005* (2013.01); *H04W 4/021* (2013.01); *H04W 4/08* (2013.01)

(58) Field of Classification Search
CPC ........ H04W 8/005; H04W 4/021; H04W 4/08
USPC ........................................................ 370/338
See application file for complete search history.

(56) References Cited

U.S. PATENT DOCUMENTS

| | | | |
|---|---|---|---|
| 7,330,112 B1 * | 2/2008 | Emigh et al. ............ | 340/539.13 |
| 7,509,131 B2 | 3/2009 | Krumm et al. | |
| 2006/0252548 A1 * | 11/2006 | Sasaki ..................... | H04L 67/38 463/42 |
| 2010/0332326 A1 | 12/2010 | Ishai | |
| 2011/0153756 A1 * | 6/2011 | Angle ...................... | H04L 51/14 709/206 |
| 2011/0307380 A1 | 12/2011 | Ido | |
| 2012/0110640 A1 * | 5/2012 | Donelson .............. | H04L 63/102 726/3 |
| 2012/0195295 A1 * | 8/2012 | Elmaleh ................ | H04W 4/023 370/338 |
| 2012/0252516 A1 * | 10/2012 | Miyabayashi .......... | H04W 4/02 455/515 |
| 2012/0254247 A1 * | 10/2012 | Sakamoto ..................... | 707/784 |
| 2013/0173336 A1 * | 7/2013 | Evans ................ | G06Q 30/0201 705/7.29 |

\* cited by examiner

*Primary Examiner* — Andrew Chriss
*Assistant Examiner* — Ellen Kirillova
(74) *Attorney, Agent, or Firm* — Cha + Reiter, LLC

(57) ABSTRACT

A nearby friend discovery method is provided, including: generating, by an electronic device, an access point (AP) list identifying one or more access points (APs), the AP list being generated based on the strength of signals received from the access points; transmitting the AP list from the electronic device to a server; receiving, by the electronic device from the server, a nearby friend list, the nearby friend list including an indication of one or more users who are located within a signal range of at least one of the access points identified in the AP list and who have previously exchanged one or more communications with a user of the electronic device; and displaying the nearby friend list.

11 Claims, 20 Drawing Sheets

| User Profile of First Mobile Terminal | User Profile of Second Mobile Terminal | User Profile of Third Mobile Terminal | ... | User Profile of Nth Mobile Terminal |
|---|---|---|---|---|
| USER IDENTITY INFORMATION | USER IDENTITY INFORMATION | USER IDENTITY INFORMATION | | USER IDENTITY INFORMATION |
| MOBILE TERMINAL NUMBER | MOBILE TERMINAL NUMBER | MOBILE TERMINAL NUMBER | | MOBILE TERMINAL NUMBER |
| ADDRESS | ADDRESS | ADDRESS | | ADDRESS |
| EMAIL ADDRESS | EMAIL ADDRESS | EMAIL ADDRESS | | EMAIL ADDRESS |
| SECURITY INFORMATION | SECURITY INFORMATION | SECURITY INFORMATION | | SECURITY INFORMATION |
| AUTHENTICATION AND AUTHORIZATION INFORMATION | AUTHENTICATION AND AUTHORIZATION INFORMATION | AUTHENTICATION AND AUTHORIZATION INFORMATION | | AUTHENTICATION AND AUTHORIZATION INFORMATION |
| PHONEBOOK INFORMATION | PHONEBOOK INFORMATION | PHONEBOOK INFORMATION | | PHONEBOOK INFORMATION |
| SNS INFORMATION | SNS INFORMATION | SNS INFORMATION | | SNS INFORMATION |
| .... | .... | .... | | .... |
| NEARBY AP 1 MAC ADDRESS SIGNAL STRENGTH | NEARBY AP 2 MAC ADDRESS SIGNAL STRENGTH | NEARBY AP 6 MAC ADDRESS SIGNAL STRENGTH | | NEARBY AP N MAC ADDRESS SIGNAL STRENGTH |
| NEARBY AP 2 MAC ADDRESS SIGNAL STRENGTH | NEARBY AP 4 MAC ADDRESS SIGNAL STRENGTH | NEARBY AP 7 MAC ADDRESS SIGNAL STRENGTH | | NEARBY AP N+1 MAC ADDRESS SIGNAL STRENGTH |
| NEARBY AP 3 MAC ADDRESS SIGNAL STRENGTH | NEARBY AP 5 MAC ADDRESS SIGNAL STRENGTH | NEARBY AP 8 MAC ADDRESS SIGNAL STRENGTH | | NEARBY AP N+2 MAC ADDRESS SIGNAL STRENGTH |
| ... | ... | ... | | ... |

241

242 (upper portion) 243 (lower portion)

| AP | ssid | MAC ADDRESS | SIGNAL STRENGTH |
|---|---|---|---|
| 1 | Tbroadnet | 23:3G:34:4G:45:18 | 94 |
| 2 | S0070VOIP | 10:24:54:31:6a:31 | 86 |
| 3 | tobis | 13:e5:04:77:P1:45 | 21 |
| 4 | Hellowireless | 4U:25:7v:6h:93:22 | 5 |
| ... | ... | ... | ... |

<1101>

| MAC ADDRESS | SIGNAL STRENGTH |
|---|---|
| 23:3G:34:4G:45:18 | 94 |
| 10:24:54:31:6a:31 | 86 |
| 13:e5:04:77:P1:45 | 21 |

<1102>

METHOD AND APPARATUS FOR FRIEND DISCOVERY

CLAIM OF PRIORITY

This application claims the benefit under 35 U.S.C. § 119(a) of a Korean patent application filed on Mar. 14, 2013 in the Korean intellectual property office and assigned serial No. 10-2013-0027594, the entire disclosure of which is hereby incorporated by reference.

TECHNICAL FIELD

The present disclosure relates to electronic devices and more particularly to a method and apparatus for friend discovery.

BACKGROUND

As the development of information communication technology spurs progress to the information-oriented society, the network is becoming one of the most inevitable and significant infrastructures. The network denotes a plurality nodes or connection points connected to each other through communication links. A network may be connected to another network and include sub-networks. The most typical network topologies include bus, star, and ring topologies, and a network is classified into one of Local Area Network (LAN), Metropolitan Area Network (MAN), and Wide Area Network (WAN) depending on the spatial distance.

The terminals connected to the network may exchange files or images among each other and perform web search and electronic mailing.

The network service may be classified into one of a wired network service and a wireless network service. The wired network service is the wire link-based connection service using a personal computer equipped with Dial-up Modem, Cable modem, or Asymmetric Digital Subscriber Line/Very High Data Rate Digital Subscriber Line (ADSL/VDSL) modem; and the wireless network service is the wireless link-based connection service based on Code Division Multiple Access (CDMA) modem or Wireless Local Area Network (WLAN) card supporting connection to the cellular network or WLAN.

Among the wireless network services, the WLAN service for connection to the Internet through a WLAN denotes the communication service in the network environment from a hub to the respective terminals using electric wave or ray (light) instead of any wired cable. The WLAN is advantageous to compensate for the shortcomings of the legacy communication technologies. The legacy cellular communication network has superiority in view of mobility and transmission coverage but also inferiority in view of data rate as compared to the wired network. Meanwhile, Bluetooth is very useful for communication within a short range of a few meters around the user's working space but inferior in view of mobility and coverage. Although the wired network shows superiority in view of data rate, it cannot guarantee mobility.

Through the comparison among the various communication technologies, it is noted that the WLAN is superior to the wired network in view of mobility, to the cellular network in view of data rate, and to the Bluetooth in view of coverage. Thanks to these advantages, the WLAN service is used widely by Internet users and various WLAN-based technologies are being developed rapidly.

The WLAN service is classified into one of independent WLAN like private network and public WLAN like public network. The independent WLAN is characterized in that the Access Point (AP) relays data for communication among the clients but not connects to any external network, while the public WLAN is characterized in that the AP works as a role of connection point for communication with legacy wired network to establish connection to any external network as well as between clients. If a wireless client moves to the service area of a new AP, it disconnects the old connection and connects to the new AP.

Typically, an Internet user connects to the Internet using the public WLAN service. In order for the user to access the Internet using the client terminal, the WLAN service provider deploys APs at nationwide service areas, the APs being connected to the authentication server for authenticating the user. The user accesses the AP installed at a WLAN service area and uses Internet through authentication procedure of the authentication server.

Meanwhile, friend search is one of the location-based services provided by a mobile communication service provider. The friend search service is the service providing the information on the location of the mobile communication terminal of the user registered as friend using the location information provided in the location registration procedure executed between base station transmitters of wireless base stations when the mobile communication terminal powers on or off, when the mobile communication terminal moves between mobile switching centers, and any parameter of the mobile communication terminal changes.

Using the friend search service, the subscriber is capable of checking the current location of a child, and elder, or a friend, location of mission mobile communication terminal, and subscriber's own location in a strange area. This service is advantageous in preventing crime, searching area, and withdrawing lost article.

However, the friend search service requires subscription or is billed per search, resulting in cost burden.

SUMMARY

According to one aspect of the disclosure, a nearby friend discovery method is provided, comprising: generating, by an electronic device, an access point (AP) list identifying one or more access points (APs), the AP list being generated based on the strength of signals received from the access points; transmitting the AP list from the electronic device to a server; receiving, by the electronic device from the server, a nearby friend list, the nearby friend list including an indication of one or more users who are located within a signal range of at least one of the access points identified in the AP list and who have previously exchanged one or more communications with a user of the electronic device; and displaying the nearby friend list.

According to another aspect of the disclosure, a nearby friend discovery method is provided, the method comprising: receiving, from a first terminal, a first indication of signal strength of a first plurality of access points; receiving, from a second terminal, a second indication of signal strength of a second plurality of access points; detecting whether the first plurality of access points and the second plurality of access points have at least one access point in common; detecting, based on a relationship database, whether a relationship exists between a first user associated with the first terminal and a second user associated with the second terminal; and transmitting, to the first terminal, an indication that the second user is located nearby the first user when the first plurality of access points and the second plurality of access points have at least one access point in common and a relationship exists between the first user and the second user.

According to yet another aspect of the disclosure, a nearby friend discovery system is provided comprising: a plurality of mobile terminals, wherein each one of the plurality of mobile terminals is configured to request a nearby friend list, receive signals from a plurality of access points (APs), generate an access point (AP) list identifying at least some of the access points based on the strength of each of the signals, and transmit the AP list to a server; and wherein the server is configured to analyze the AP lists transmitted by the mobile terminals and detect whether the users of at least two of the mobile terminals are friends based on the at least two terminal's respective lists and a relationship database, generate a nearby friend list when the users are friends, and transmits the nearby friend list to the respective mobile terminal of at least one of the users.

BRIEF DESCRIPTION OF THE DRAWINGS

FIG. 3 is a diagram illustrating an example of user profile tables of a friend relationship DB of a server according to an aspect of the present disclosure;

DETAILED DESCRIPTION

The examples provided herein are described with reference to the accompanying drawings in detail. The same reference numbers are used throughout the drawings to refer to the same or like parts. Detailed description of well-known functions and structures may be omitted to avoid obscuring the subject matter of the present disclosure.

The specification and drawings are to be regarded in an illustrative rather than a restrictive sense in order to help understand the present disclosure. It is obvious to those skilled in the art that various modifications and changes can be made thereto without departing from the broader spirit and scope of the disclosure.

Figure 1:
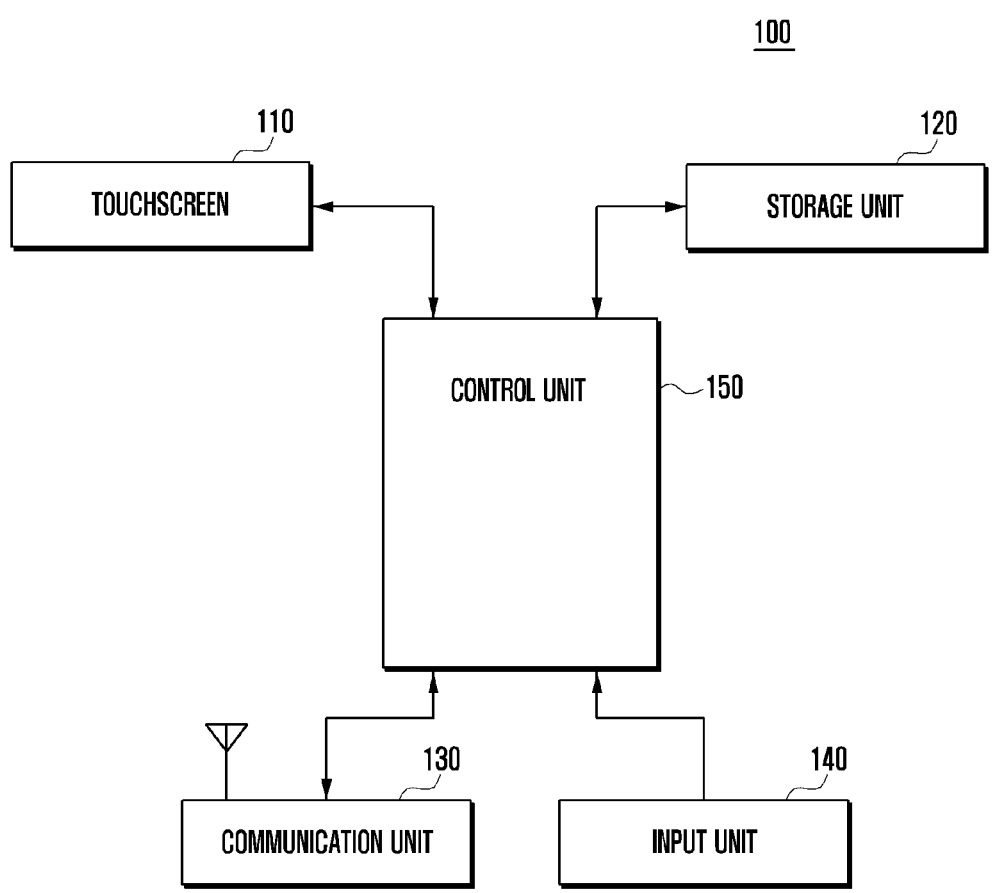
FIG. 1 is a block diagram illustrating an example of a configuration of a mobile terminal according to an aspect of the present disclosure.

FIG. 1 is a block diagram of an example of a mobile terminal according to an aspect of the present disclosure. Referring to FIG. 1, the mobile terminal 100 according to an aspect of the present disclosure includes a touchscreen 110, a storage unit 120, a communication unit 130, an input unit 140, and a control unit 150.

The touchscreen 110 provides the execution screens of the applications running on the mobile terminal 100. For example, the touchscreen displays the executions screens of file display function, file search function, messaging function, electronic mail function, Internet function, multimedia function, photo view function, and music play function. The touchscreen 110 may be implemented with one of Liquid Crystal Display (LCD) and Organic Light Emitting Diodes (OLED). Particularly in an aspect of the present disclosure, the touchscreen 110 provides the UI for display phonebook and Social Network Service (SNS) (e.g. Facebook, Twitter, and KakaoTalk) screen. The touchscreen 110 may work as an input means for receiving touch gesture-based input.

The storage unit 120 stores various programs and data executed and processed in the mobile terminal 100 and implemented with at least one of volatile memory device, e.g. Dynamic Random Access Memory (DRAM) and non-volatile memory device, e.g. flash memory. The storage unit 120 stores the Operating System (OS) of the mobile terminal 100. Particularly in an aspect of the present disclosure, the storage unit 120 stores the phonebook and SNS relationship information. The storage unit 120 also may store the information on the APs. The mobile terminal 100 stores the information on the AP by received signal strength on the background. The AP information includes Service Set Identifier (SSID), Media Access Control (MAC) address, and received signal strength of AP. At this time, the phonebook and SNS relationship are static filed information and the AP information is dynamic field information.

The communication unit 130 includes a cellular communication module capable of establishing a communication channel with the base station for supporting communication function of the mobile terminal 100 and receiving information and file from outside under the control of the user or according to the preconfigured schedule information and transmitting the information stored or collected in the mobile terminal 100 to the outside.

The communication unit 130 may include a communication module for supporting local area communication function capable of establishing a local area communication channel with another terminal and transmitting any information, e.g. file and folder. Particularly, the communication unit 130 is capable of establishing a channel with the AP for use of Wi-Fi service.

The input unit 140 generates various input signals necessary for operating the mobile terminal 100. The input unit 140 may include a home key, side keys, menu keys, etc. The input unit 140 may be implemented with various input means such as keyboard, keypad, and key buttons. In association with the touchscreen 110, the input unit 140 may receive a user input through the touchscreen 110. Particularly in an aspect of the present disclosure, the touchscreen 110 may receive commands for discovering nearby friends and sharing information with the discovered friends using the proposed UI.

The control unit 150 controls overall operations of the components of the mobile terminal 100. The control unit 150 checks the electric wave strength, i.e. signal strength, from the APs around. The control unit 150 scans around to generate an AP list listing the APs.

The control unit 150 extracts SSID and MAC address and measures signal strengths from the packets transmitted by the adjacent APs to generate the AP table.

Figure 12:
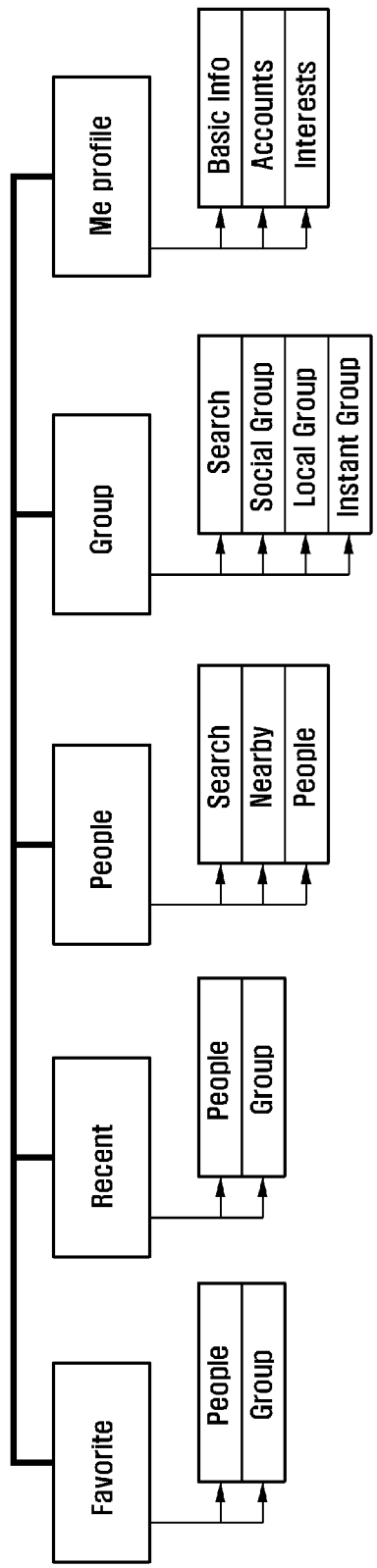
FIG. 12 is a diagram illustrating an example of the information structure of a phonebook application of the mobile terminal according to an aspect of the present disclosure.

The control unit 150 sorts out the APs of which signal strength is greater than a predetermined threshold to generate the AP list and sends the server the AP list. Particularly, the AP list may be transmitted to the server in the procedure of connecting to the Internet or pushed automatically according to the configuration of the mobile terminal 100. For example, if the contact information as shown in FIG. 12 is set to off, the mobile terminal 100 transmits the AP list to the server at the time when the it connects to the Internet or telephony session starts and, otherwise the contact information is set to on, pushes the AP list to the server at a regular interval.

Figure 2:
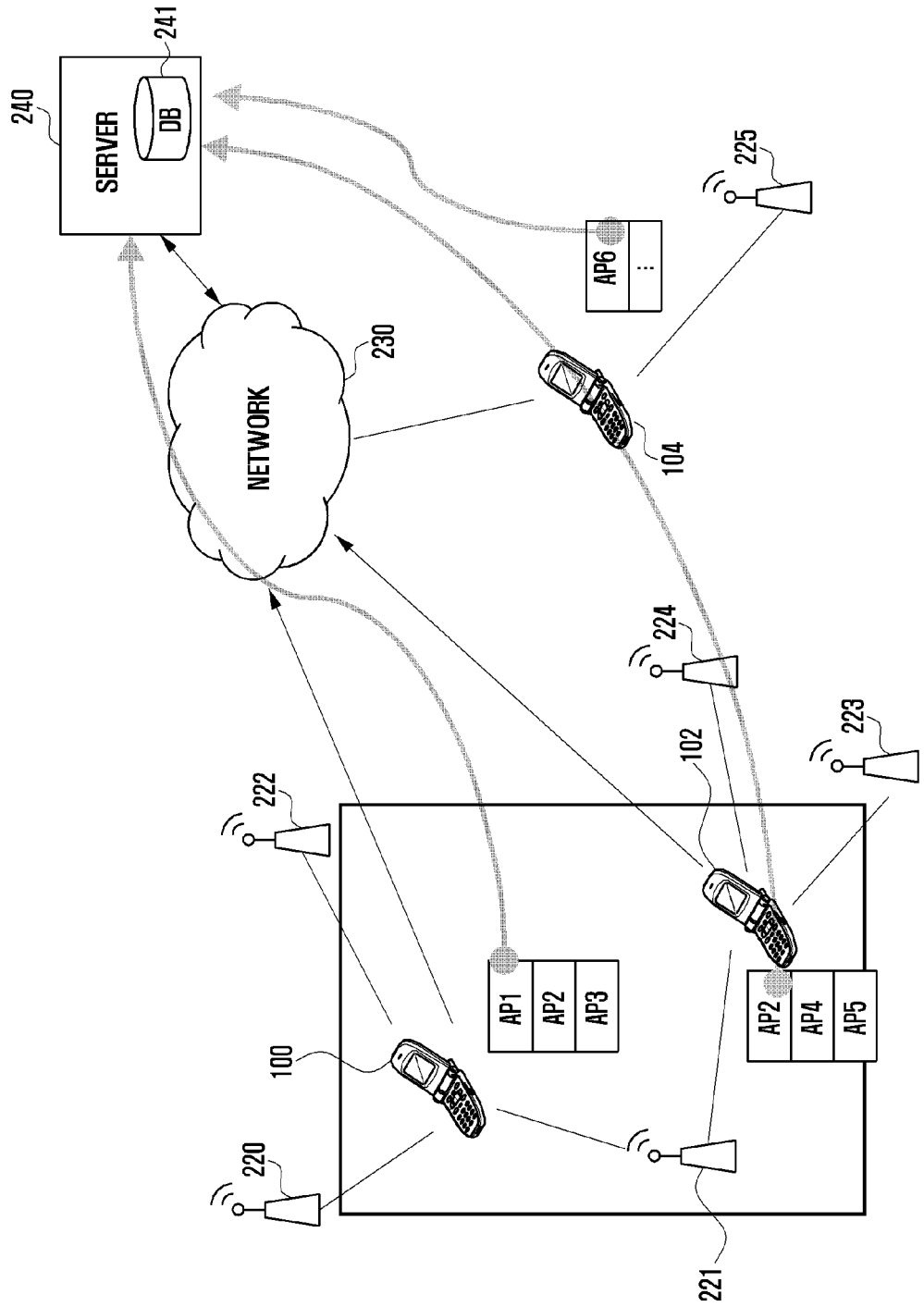
FIG. 2 is a diagram illustrating an example of a network architecture for a nearby friend discovery system according to an aspect of the present disclosure.

FIG. 2 is a diagram illustrating an example of a network architecture implementing a nearby friend discovery system according to an aspect of the present disclosure. Referring to FIG. 2, the nearby friend discovery system according to an aspect of the present disclosure includes mobile terminals 100-104, APs 220 to 225, a network 230, and a server 240.

The APs 220 to 225 transmit a signal to the mobile terminals 100-104. The mobile terminals 100-104 measure the signal's strength to determine whether it is possible to connect to the AP 220 to 225. If the signal strength is sufficiently high, the mobile terminals 100-104 may establish wireless connection to the APs 220 to 225. 100-104 If a mobile terminal requests connection to an AP and is authenticated by the server 240 successfully, the AP assigns an Internet Protocol (IP) address to that terminal to provide WLAN service for connection to the network 230.

The APs 220 to 225 provide physical interfaces in order for the terminals 100-104 to connect to network 230. The APs 220 to 225 may perform Dynamic Host Configuration Protocol (DHCP) process to allocate dynamic IP addresses to the terminals 100-104.

The terminal 100-104 connects to the network 230 directly through wireless channels or via APs 220 to 225. Each of the terminals 100-104 includes a WLAN card for wireless communication with the APs 220 to 225, memory storing an access program for accessing the APs 220 and 225, a control unit 150 having a microprocessor performing computation for controlling the overall operations of the terminal, an input unit 140 for receiving authentication data and command input by the user, a touchscreen implemented with the LCD or OLED for displaying received data.

One or more of the terminals 100-104 may include any suitable type of an electronic device, such as a Portable Multimedia Player (PMP) digital broadcast player, Personal Digital Assistant (PDA), music player (e.g. MP3 player), mobile gaming console, smartphone, navigator, a portable computer such as laptop computer, and a non-portable computer, such as a desktop computer.

The terminals 100-104 measure the signal strengths of the adjacent APs 220 to 225. The terminals 100-104 may then generate an AP list listing the APs 220 to 225. The AP list may be sorted by signal strength or signal reception time. Each item of the AP list may include an SSID, MAC address, and signal strength of a given AR. For example, if the first terminal 100 has found the first AP 220, the second AP 221, and the third AP 222, and their respective signal strengths exhibit the relationship of first AP 220>second AP 221>third AP222, the first mobile terminal 100 may generate the AP list sorted by signal strength, i.e. in the order of first AP 220, second AP 221, and third AP 222. Likewise, the second mobile terminal 102 may generate the AP list sorted in the order of the second AP 221, the fourth AP 223, and the fifth AP 224. The third mobile terminal 104 may also generate the AP list based on the signal strengths of the APs in the same manner.

Each of the mobile terminals 100-104 may generate an AP list identifying the APs of which received signal strength is greater than a predetermined level. According to an aspect of the present disclosure, the AP list may be transmitted to the server when the mobile terminal is connected to the Internet. Additionally or alternatively, the AP list may be pushed to the server according to the contact information of the terminal as shown in FIG. 12.

In some implementations, the first mobile terminal 100 may send the server 240 an AP list via the network 230. The server 240 then stores the AP list in a friend relationship DB 241 as a part of user information (Me Profile). The information recorded in the AP list may be referred to as dynamic field information as it may change dynamically according to various events. For example, when the first mobile terminal 100 connects to the network 230 via a cellular communication network or the APs 220 to 225, the server may detect this and refresh the AP list. Additionally or alternatively, in some implementations, the first mobile terminal 100 may push the AP list to the server 240 at a predetermined interval to refresh the AP list.

Likewise, the second mobile terminal 102 also may send the server 240 an AP list including the MAC addresses and signal strengths of the second AP 221, the fourth AP 223, and the fifth AP 224 via the network 230. Similarly, the third mobile terminal 104 also may send an AP list including the MAC address and signal strength of the sixth AP 225 via the network 230.

The network 230 may be any suitable type of communications network. For example, the network 230 may be a homogeneous network of WLAN such as Internet which provides various TCP/IP and higher layer protocol-based services, e.g. Hypertext Transfer Protocol (HTTP), Telnet, File Transfer Protocol (FTP), Domain Name System (DNS), Simple Mail Transfer Protocol (SMTP), Simple Network Management Protocol (SNTP), Network File Service (NFS), and Network Information Service (NIS). As another example, the network 230 may be a heterogeneous network of WLAN such as analog communication network, Code Division Multiple Access (CDMA) network, Global System for Mobile communications (GSM) network.

The server 240 includes a friend relationship database (DB) 241 which is updated with the AP lists received from the mobile terminal 100-104 and compares the MAC addresses to determine, when the same MAC address exists, the corresponding terminal is nearby. The server 240 searches the friend relationship DB 241 for the nearby terminals and, if the nearby terminals are registered with the friend list, sends the terminals 100-104 the information that the terminals 100 and 104 are of friends.

For example, the server may search the friend relationship DB 241 for the nearby mobile terminals 100-104 and detect that the user of the mobile terminal 100 is a friend of at least one of the users of terminals 100 and 104. For example, the server may determine that the user of the terminal 102 is a friend of the user of the terminal 100 when the user of the terminal 102 is identified in at least one of the phonebook of the user of the mobile terminal 100, the SNS address list of the user of the terminal 100, and the email address list of the user of the mobile terminal 100. Next, upon determining that the user of the terminal 102 is a friend of the of the user of the terminal 100, the server may generate a nearby friend list including the information on the second mobile terminal 102 and transmit the generated list to the mobile terminal 100.

In some implementations, the friend relationship DB 241 may be a DB including SNS address lists of the mobile terminals 100-104 and phonebooks stored in the mobile terminals 100-104, static field information such as email address information, and dynamic field information including the AP information, and stores user profiles of the users of the mobile terminals 100-104. An example of the structure of the friend relationship DB 241 is described with reference to FIG. 3.

As discussed above, the server 240 may send nearby friend lists to the mobile terminals 100-104. At this time, if there are no friends of the users of mobile terminals 100-104 that are located nearby, the server 240 may transmit a null state (e.g., empty) nearby friend list to the mobile terminals 100-104 to indicate the absence of any nearby friends.

FIG. 3 is a diagram illustrating user profile tables of a friend relationship DB of the server according to an aspect of the present disclosure. Referring to FIG. 3, the friend relationship DB 241 of the server includes the user informations on the mobile terminals 100 to 142 in match with the records of the database.

As illustrated, each of the records includes a static field information section 242 and a dynamic field information section 243. The static field information section 242 may include user-specific information, and the dynamic field information section 243 may include MAC addresses and signal strengths of adjacent APs.

The static field information section 242 includes user identity information, such as unique identifiers of the mobile terminals 100-104, mobile terminal numbers for use in communication with the corresponding mobile terminals 100-104 (e.g., telephone numbers), addresses, email addresses, security information, authentication and authorization information, phone books containing phone numbers, and SNS information. The static field information section 242 includes the information that is not changed unless the user or server operator modifies the corresponding informations.

In some implementations, users may connect to the server 240 via the APs 220 to 225 or wireless communication channel to modify the friend relationship DB. As described above, it is possible to update the friend relationship DB 241 automatically based on a change in the phonebooks, email addresses, and SNS information of the mobile terminals 100-104 periodically. Also, it is possible to update the friend relationship DB 241 based on the phonebooks, email addresses, and SNS information of the mobile terminals 100-104 upon connection to the server 240.

The dynamic field information section 243 may include information varying in dependence upon the location of the mobile terminals 100-104. As described above, the dynamic field information section 243 may include the MAC addresses and signal strengths of the neighboring APs 220 to 225 and information on the connections to the APs 220 to 225 (not shown).

The server 240 compares the MAC addresses and signal strengths of the dynamic field information section 243 to determine whether the users of the mobile terminals 100-104 are nearby each other. If it is determined that there are users nearby each other based on the dynamic field information section 243, the server 240 determines whether the nearby users are friends based on the static field information.

Figure 4:
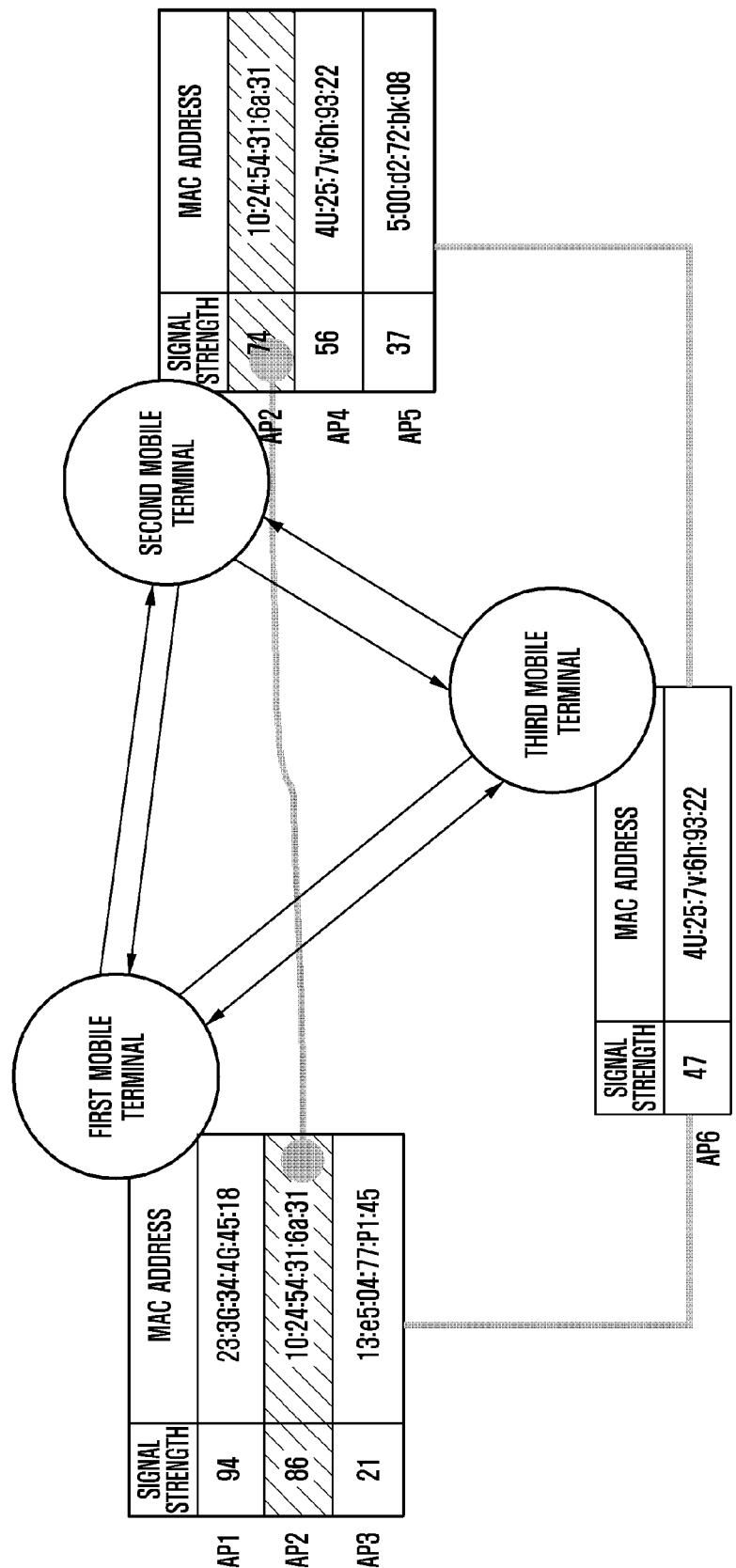
FIG. 4 is a diagram illustrating an example of a mechanism for discovering friends by comparing, at the server, the AP lists of the terminals according to an aspect of the present disclosure.

FIG. 4 is a diagram illustrating an example of a mechanism for discovering friends by comparing, at the server, the AP lists of the terminals according to an aspect of the present disclosure.

In the exemplary situation of FIG. 4, the server compares the MAC addresses included in the user profiles of the friend relationship DB 241 updated with the AP list received from the mobile terminals. The server checks that the user profile of the first mobile terminal 100 includes the MAC address of the second AP 221 and the user profile of the second mobile terminal 102 includes the MAC address of the second AP 221. Accordingly, the server 240 determines that the users of the first and second mobile terminals 100 and 102 are near each other.

In one aspect of the disclosure, when there are no matching MAC addresses of APs in the AP lists submitted by the first and third mobile terminals 100 and 104, the server may determine the first and third terminals are not near each other. More particularly, the server may detect that in the user profiles updated with the AP lists received from the second and third mobile terminals 102 and 104, there is no matching MAC address of AP in the user profiles of the users of the second and third mobile terminals 102 and 104 and based on this the server may determine that the first and third terminals are not near each other.

In another aspect of the disclosure, the server 240 checks the user profiles in the friend relationship DB 241 to determine whether any of the users of the mobile terminals 100-104 are friends with one another. In the example of FIG. 2, the server 240 retrieves from the friend relationship DB 241 information associated with the user of the first mobile terminal 100. In addition, the server 240 retrieves from the friend relationship DB 241 information associated with the user of the second mobile terminal 102. Then, based on at least some of the retrieved information, the server 240 determines whether the users of the first and second mobile terminals are friends with each other.

The server recognizes the friend relationship when the users of the first and second mobile terminals 100 and 102 are registered as friends, but the first mobile terminal 100 registers the user of the second mobile terminal 102 as friend. In the case that the user of the second mobile terminal 102 has not registered the user of the first mobile terminal 100 as friend, the server 240 notifies the user of the second mobile terminal 102 of the proximity of the terminal of the friend using a synch signal (s). The server 240 inquire of the second mobile terminal 100 whether to register the friend and notifies, if the user registers the friend, the proximity of the user of the first mobile terminal 100 using the synch signal (s).

In some instances, the information associated with a user of the first terminal may identify a user of the second terminal as a friend of the user of the first terminal. At the same time, however, the information associated with the user of the second terminal, may fail to identify the user of the first terminal as a friend of the user of the second terminal. In such instances, the server 240 may transmit an indication to the first terminal that the user of the second terminal is nearby the user of the first terminal. Furthermore, the server 240 may transmit to the user of the second terminal a query asking the user of the second terminal whether to add the user of the first terminal as a friend. If the user of the second terminal answers in the affirmative, the server 240 may modify the information associated with the user of the second terminal to indicate that the user of the first terminal has become a friend of the user of the first terminal.

As a result of checking the friend relationship DB 241 of the second mobile terminal 102, since the information on the first mobile terminal 100 exists in the friend relationship DB 241 of the second mobile terminal 102, the user of the first mobile terminal 100 is the friend to the user of the second mobile terminal 102. Accordingly, the server 240 determines that the users of the first and second mobile terminals 100 and 102 are registered as friends with each other. At this time, since the server 240 knows the locations of the APs 220 to 225, if the AP list includes at least three APs 220 to 225, it is possible to calculate the locations of the mobile terminals 100-104 through the trigonometrical function with the signal strengths or by tracking the three signal reach ranges.

If the friend relationship between the users of the adjacent mobile terminals 100-104 are recognized, the server 240 generates a nearby friend list based on the friend relationship and sends the nearby friend list to the corresponding mobile terminals 100-104.

Figure 5:
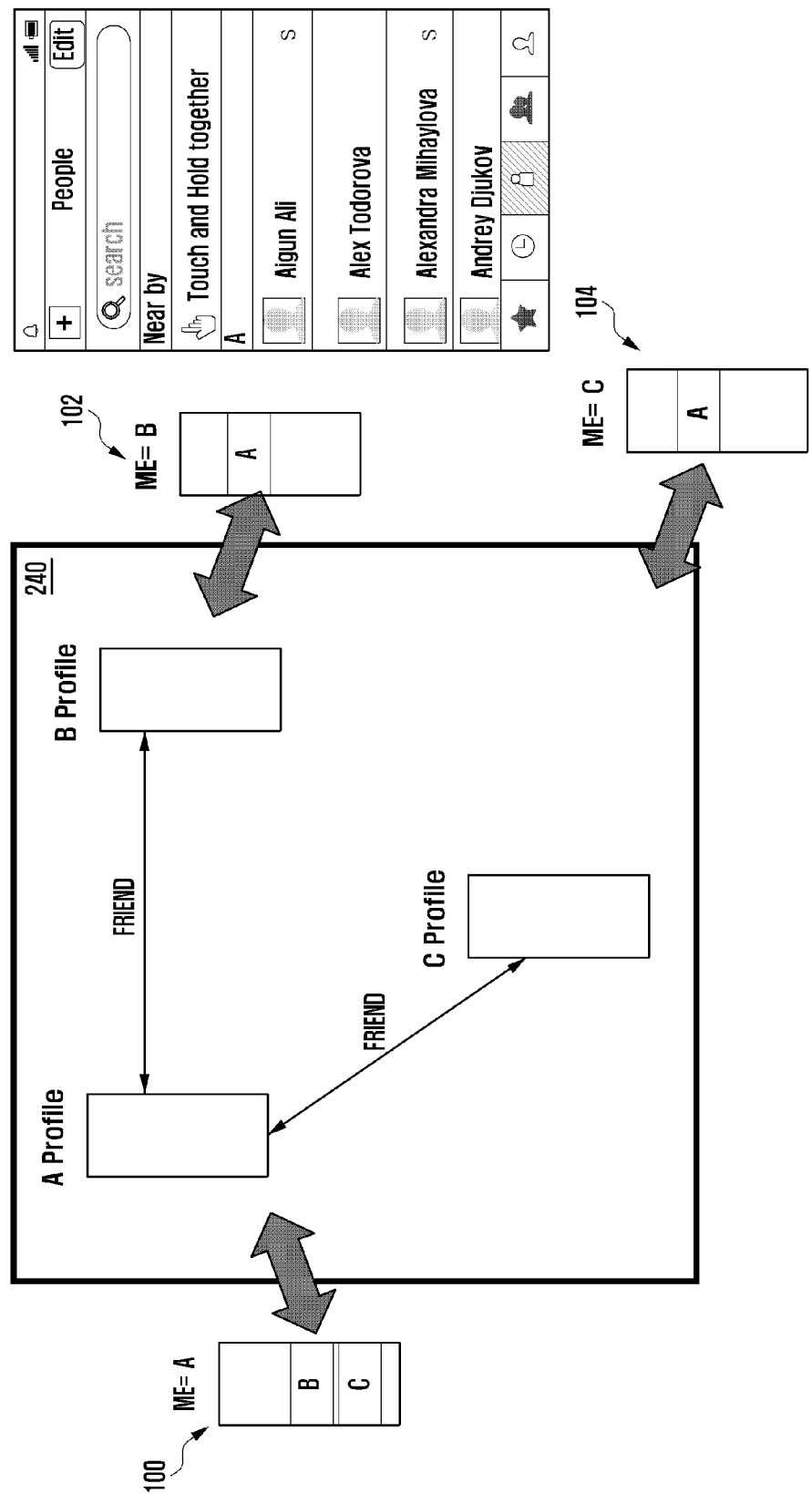
FIG. 5 is a diagram illustrating an example of a mechanism for configuring the friend relationship at the server according to an aspect of the present disclosure.

FIG. 5 is a diagram illustrating an example of a mechanism for configuring a friend relationship at the server according to an aspect of the present disclosure. Referring to FIG. 5, when at least one user is identified in the user profile of another user, the server may determine that the two users are friends.

For example, the server 240 has the unique information on the users B and C. At this time, if there is the user A information in the user B profile, the server 240 determines that the user A is the friend of the user B. Likewise, if there is user A information in the user C profile, the server 240 determines that the user A is the friend of the user C. If it is determined that the users A and B are friends, the server 240 sends the synch signal to the users A and B such that the name of user A is marked with "s" in the mobile terminal of the user B and the name of user B is marked with "s" in the mobile terminal of the user A to notify that they are recognized as nearby friends.

Figure 6:
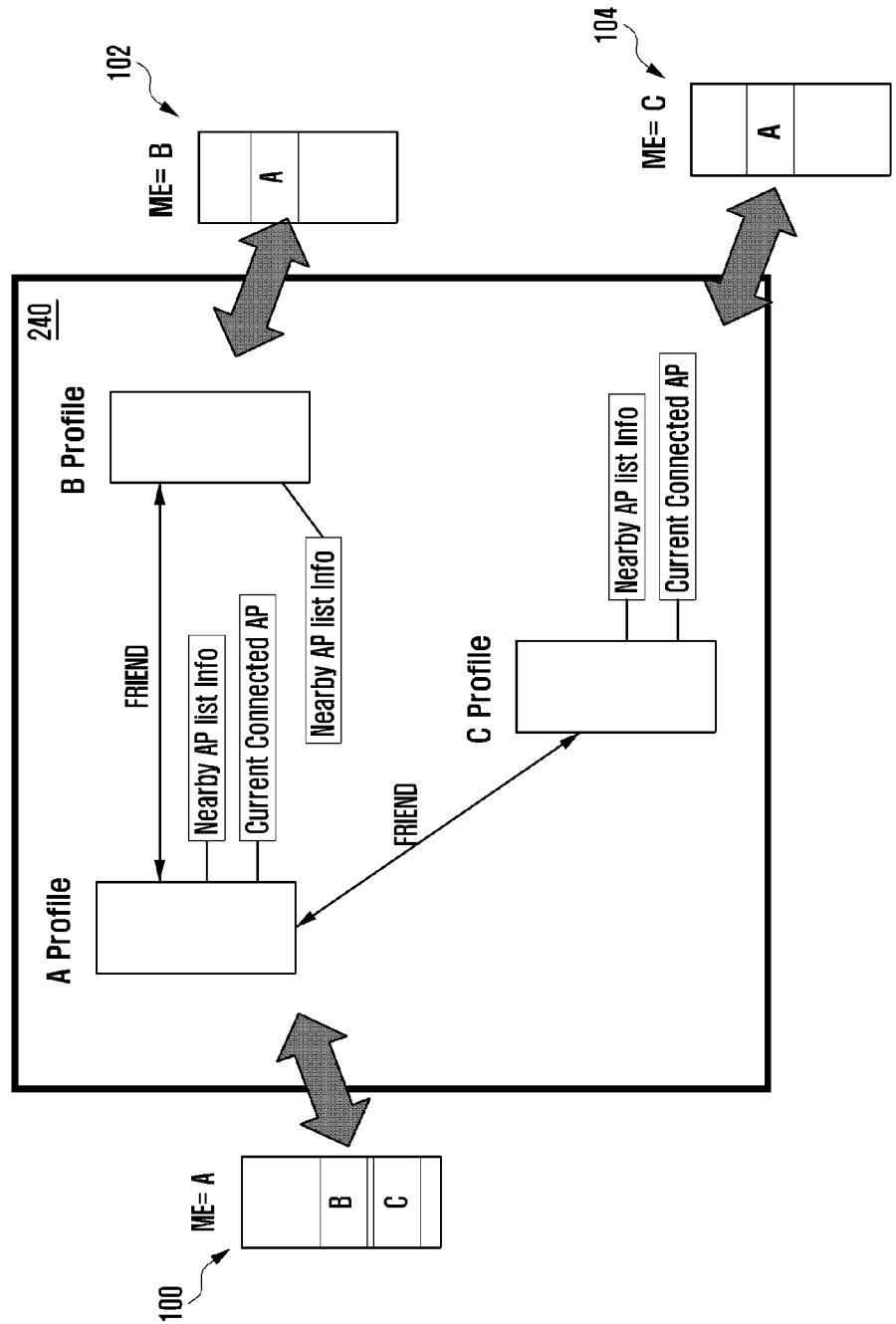
FIG. 6 is a diagram illustrating an example of a mechanism for configuring the friend relationship at the server according to another aspect of the present disclosure.

FIG. 6 is a diagram illustrating an example of a mechanism for configuring the friend relationship at the server according to another aspect of the present disclosure. Referring to FIG. 6, the server 240 retains the device state information profile corresponding to the each user profile information. The device state information profile includes the nearby AP list information and (Nearby AP list Info) and connected AP information (Current Connected AP).

Each of the mobile terminals 100-104 may report the nearby AP information periodically as scheduled or non-periodically when it connects to the AP 200 to 225.

The server 240 updates the dynamic field information of the user profiles with the nearby AP information and connected AP information (not shown) received from the mobile terminals 100-104 of the respective subscribers. For example, the server 240 may compare the nearby AP list information of the user A profile and the nearby AP list information of the user C profile to determine the proximity of the mobile terminals of the two users. Likewise, the server 240 may compare the nearby AP list of the user A profile and the nearby AP list of the user B profile to determine the proximity of the mobile terminals of the two users. If the MAC address of the first AP 220 is in the user A profile and the MAC address of the first AP 220 is in the user B profile, the server 240 determines that the two users are nearby and, if the user B information is in the user A profile, that the users A and B are friends. In response to determining that users A and B are near each other, the server may notify the user A's mobile terminal of the nearby presence of the user B.

Figure 7:
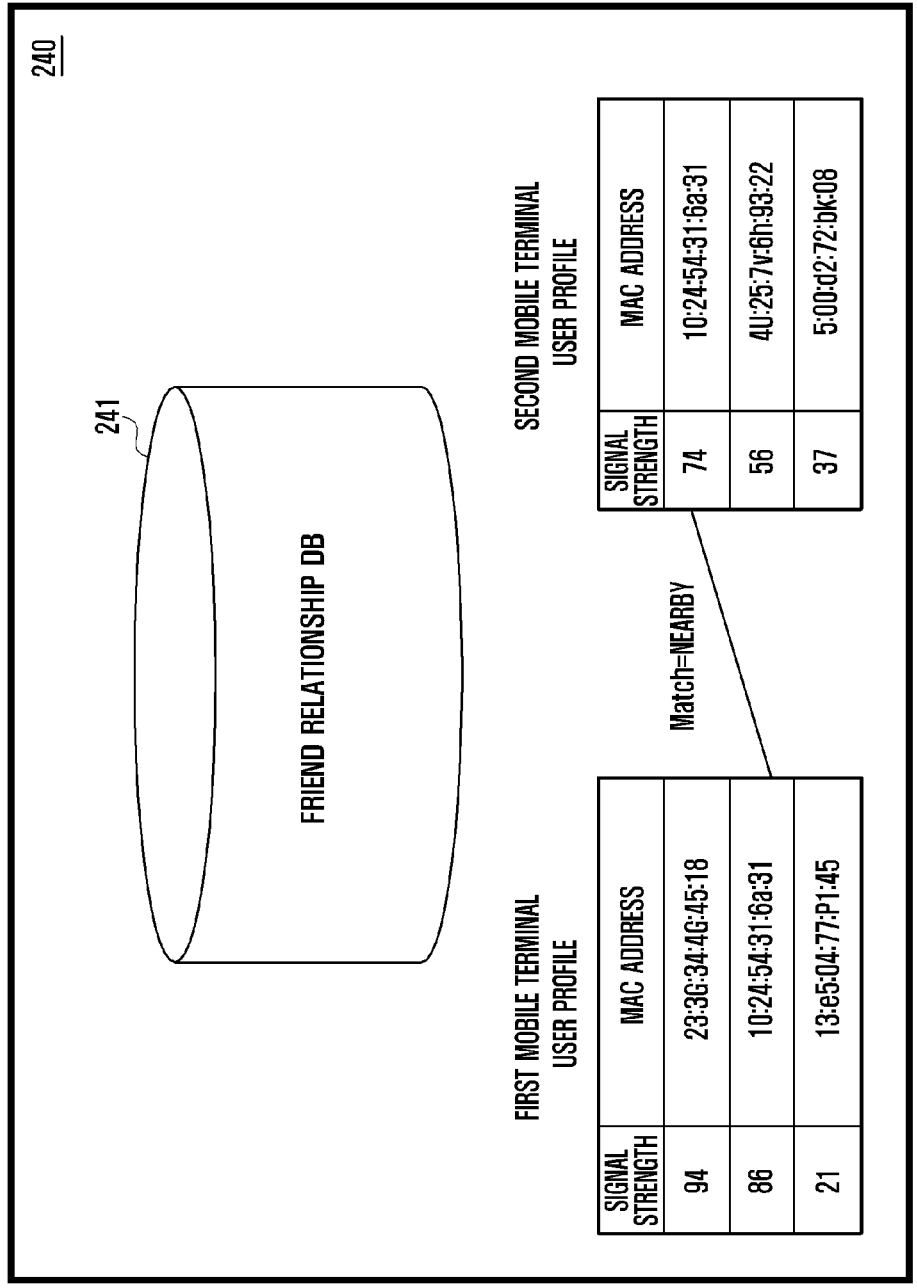
FIG. 7 is a diagram illustrating an example of a mechanism for determining proximity of the users based on the AP informations included the user profiles of the friend information database of the server according to an aspect of the present disclosure.

FIG. 7 is a diagram illustrating an example of a mechanism of determining proximity of the users based on the AP informations included the user profiles of the friend information database of the server according to an aspect of the present disclosure. Referring to FIG. 7, the dynamic field information updated with the AP lists of the two user profiles in the friend relationship DB 241 is depicted partially. The server 240 recognizes that the user profiles of D1 and D2 include the same MAC address (10:24:54:31:6a:13).

The received signal strength of the second AP 121 corresponding to the MAC address 10:24:54:31:6a:13 is 86 dB at the first mobile terminal 100 and 74 dB at the second mobile terminal 102 that are both greater than the threshold level of 10 dB. In this case, the server 240 determines that the first and second mobile terminals 100 and 102 of the respective subscribers D1 and D2 are nearby each other.

Figure 8:
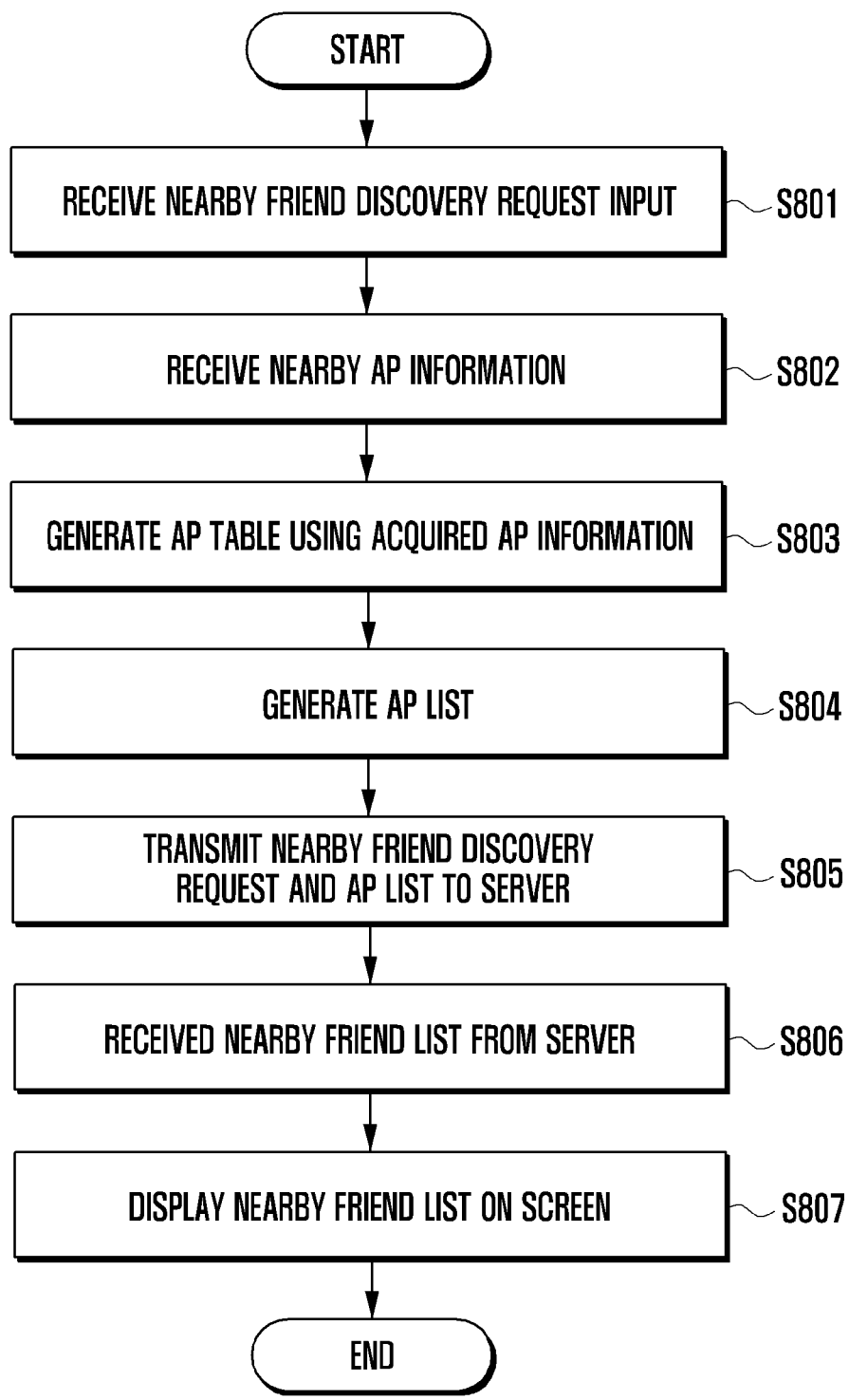
FIG. 8 is a flowchart illustrating an example of a nearby friend discovery procedure of a mobile terminal according to an aspect of the present disclosure.

FIG. 8 is a flowchart illustrating an example of a nearby friend discovery procedure of a mobile terminal according to an aspect of the present disclosure. Referring to FIG. 8, the mobile terminal receives a nearby friend discovery request input by the user at operation S801. The terminal receives AP information from the adjacent APs 220 to 225 at operation S802. The AP information may include signal strengths, SSIDs, and MAC addresses of the respective APs 220 to 225.

The mobile terminal analyzes the information transmitted by the adjacent APs 220 to 225 to generate an AP table at operation S803. The mobile terminal may sort the AP table in an order of the signal strength. It is also possible to generate the AP table independently of the signal strength. The AP table includes the SSIDs, MAC addresses, and signal strengths of the APs 220 to 225. For example, the first mobile terminal 100 receives the signals from the first to third APs 220, 221, and 222; and sorts the APs in a descending order of signal strength, i.e. in the order of the first AP 220, the second AP 221, and the third AP 222.

At operation S804, the mobile terminal generates an AP list based on the table AP table. By way of example, the AP table may be sorted in the order of signal strengths or signal reception times from the APs 220 to 225. At operation 806, the first mobile terminal transmits the AP list along with a nearby friend discovery request to a server. In response, the mobile terminal receives the nearby friend list transmitted by the server 240 at operation S806. The mobile terminal then displays the nearby friend list received from the server 240 on the screen at operation S807. At this time, the nearby friend list may be presented in the form of phonebook entries marked with "s". In the case of receiving the null state nearby friend list, the mobile terminal may display a message notifying of no nearby friend.

Figure 9:
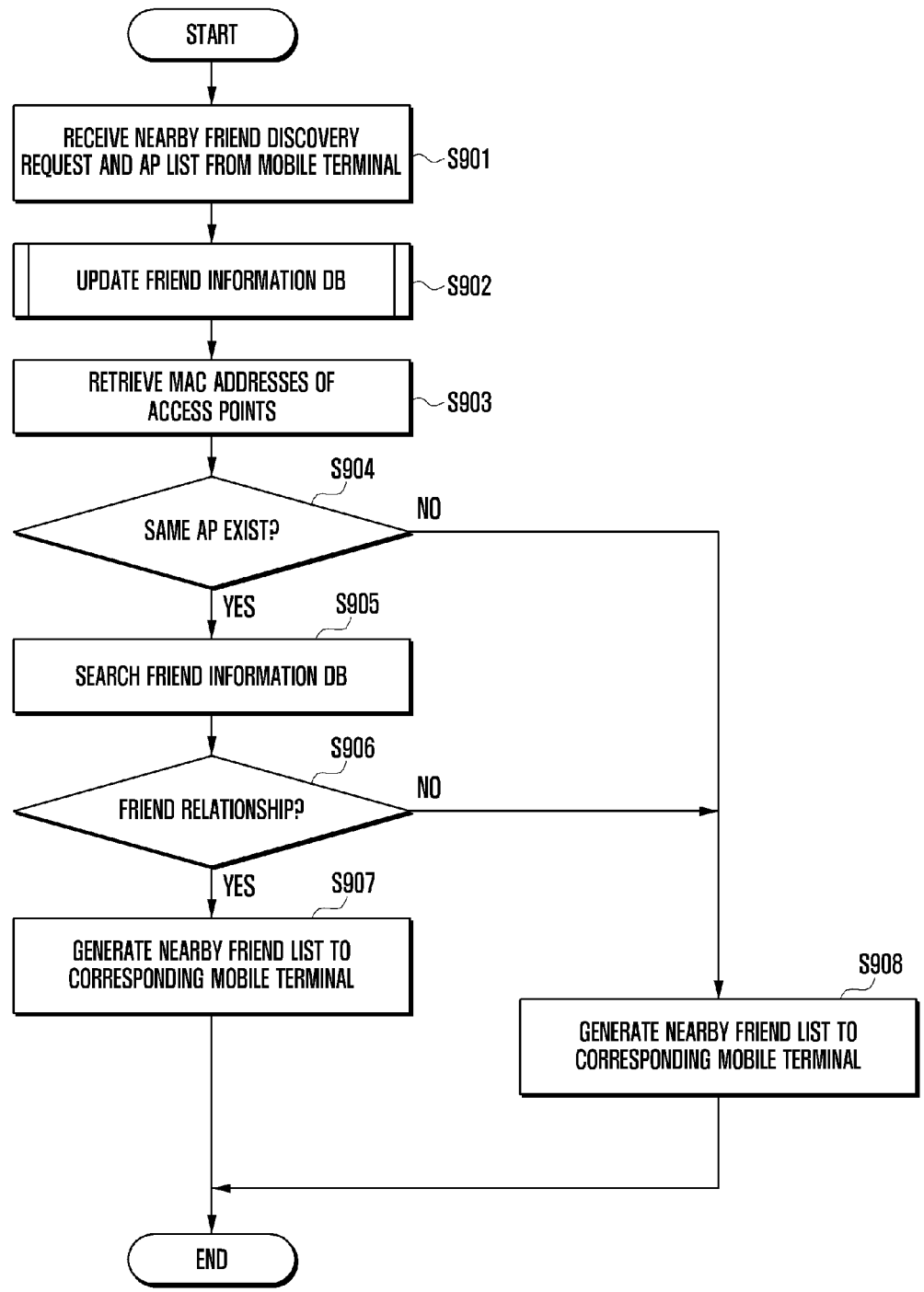
FIG. 9 is a flowchart illustrating an example of a nearby friend discovery procedure of a server according to an aspect of the present disclosure.

FIG. 9 is a flowchart illustrating an example of a nearby friend discovery procedure of a server according to an aspect of the present disclosure. Referring to FIG. 9, the server 240 receives a nearby friend discovery request and AP list from any of mobile terminals 100-104 at operation 901. The server 240 updates the MAC addresses and signal strengths fields of the corresponding user profile in the friend relationship DB at operation S902. At this time, the AP list may be pushed to the server 240 at a predetermined interval configured according to the contact information or transmitted when the mobile terminal connects to the Internet. Since the nearby friend request is also transmitted at the time of connecting to the Internet, the AP list may be transmitted to the server 240 along with the nearby friend request. Although, in this example, the mobile terminal is configured to push the AP list at the interval configured according to the contact information, the AP list may be transmitted at the time when the mobile terminal connects to the Internet too.

The server 240 retrieves the AP MAC addresses identified in each of the user profiles of the friend relationship DB 241, in operation S903.

The server 240 compares the MAC addresses registered with the user profiles to check the mobile terminals having the same AP MAC address at operation S904. If there are mobile terminals having the same AP MAC address, the server 240 references the friend relationship DB to determine whether the users corresponding to the user profiles having the same AP MAC address have a friend relationship at operation S905. The friend relationship may be determined based on the phonebook information, SNS information, and email address information of the static field information. For example, the server 240 may check the phonebooks, SNS address books, and email address books of the mobile terminals to retrieve the friend relationship among users of the corresponding mobile terminals. In the case of using the phonebook, the phone number is the unique information and, thus, if the phone number of one user is included in the phone book of another user, the two users may be considered friends. In the case of using the SNS address book, the SNS ID may be used as the unique information. Thus, if the SNS ID of one user is included in the SNS information that is part of another user's profile, the two users may be considered friends. In the case of using the email address, the email address or email ID may be used as the unique information. Thus, if a user's profile's email information indicates that the user has exchanged emails with another user, the two users may be considered friends.

The server 240 determines whether the users of the adjacent mobile terminals are friends based on the information provided by the friend relationship DB 141.

If it is determined that the users of two of the mobile terminals 100-104 that are located nearby one another are friends at operation S906, the server 240 generates a nearby friend list including the information on the nearby friends based on the friend relationship analysis result and sends the nearby friend list to the to the two of the mobile terminals that are located nearby one another, at operation S907.

Figure 10:
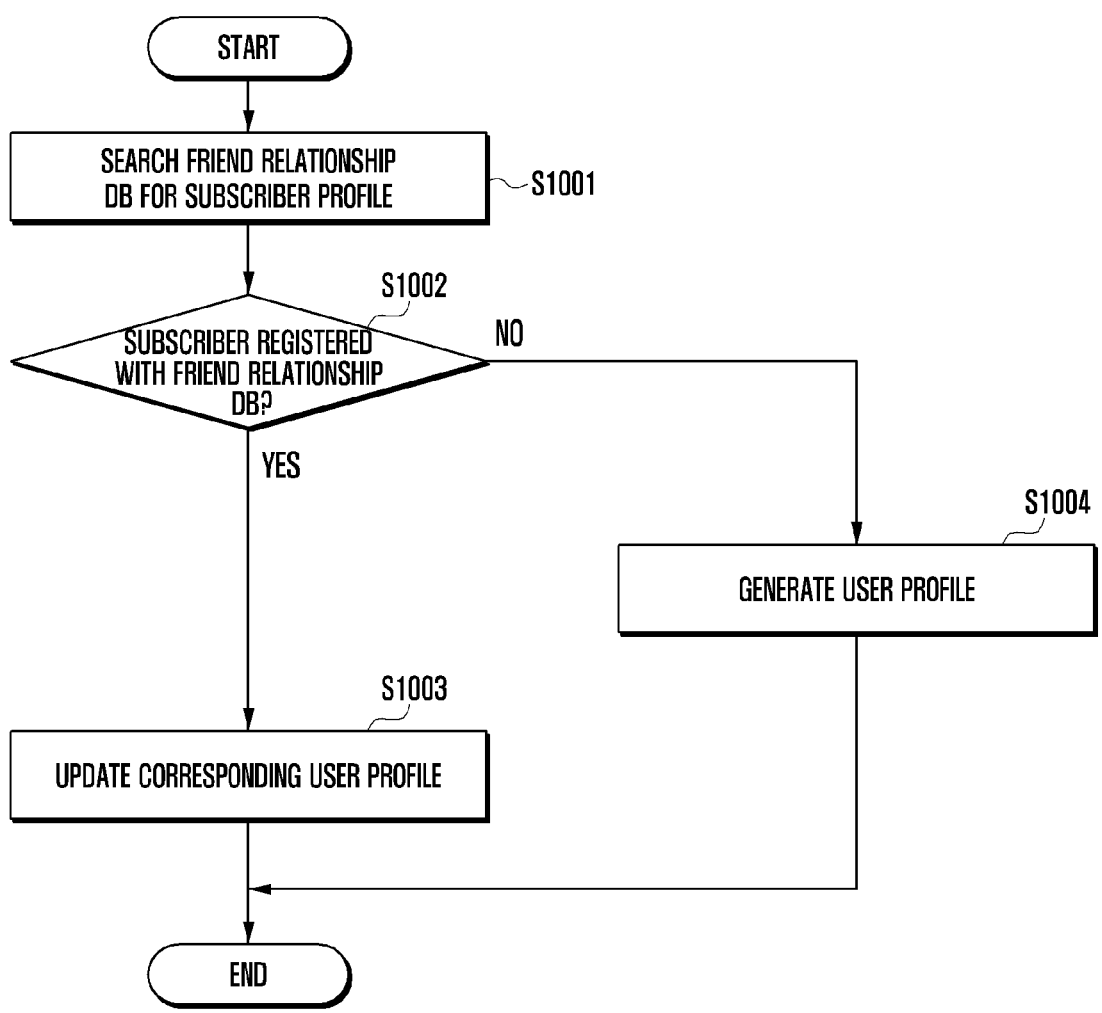
FIG. 10 is a flowchart illustrating an example of a procedure of updating the friend relationship DP with the received AP lists according to an aspect of the present disclosure.

FIG. 10 is a flowchart illustrating an example of a procedure for updating the friend relationship DP with the received AP lists according to an aspect of the present disclosure. Referring to FIG. 10, the server 240 searches the friend relationship DB 241 for the information on a user who has transmitted the AP list at operation S1001.

The server 240 determines at operation S1002 whether the user who has transmitted the AP list has the user profile registered with the friend relationship DB 241 based on the search result of operation S1001.

If the user who has transmitted the AP list has the user profile registered with the friend relationship DB 241, the server updates the user profile with the received AP list at operation S1003. If the subscriber who has transmitted the AP list has no user profile registered with the friend relationship DB 241, the server 240 generates the user profile with the received AP list in the friend relationship DB 241 at operation S1004. If necessary, it is possible to prompt the user to provide additional information that is necessary for generating the user profile.

Figure 11:
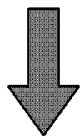
FIG. 11 is a diagram illustrating an example of the relationship of the AP table and AP list for use in nearby friend discovery method according to an aspect of the present disclosure.

FIG. 11 is a diagram illustrating an example of the relationship of the AP table and AP list for use in nearby friend discovery method according to an aspect of the present disclosure. FIG. 11 exemplifies the AP table generated by the first mobile terminal 100. Reference number 1101 denotes the AP table listing the AP numbers representing the APs 220 to 225. The APs may be sorted in the order of their signal strengths or signal reception times therefrom.

The control unit 150 writes the SSID of each AP in the AP table. The SSID is the name of the radio access network that may be designated by the user in the case of the private AP or by the service provide in the case of the public AP.

The MAC address is the unique number of the LAN card of the AP which has been allocated by the LAN card manufacturer. The server 240 is capable of identifying the APs 200 to 225 based on their MAC addresses.

The signal strength denotes the strength of the signal received from each of the APs 220 to 225 and is expressed in unit of dB. The stronger the received signal strength is, the higher the reception sensitivity.

The first mobile terminal 100 generates the AP list by processing the AP table. The AP list is denoted by reference number 1102. The AP list includes the APs of which received signal strengths are equal to or greater than a predetermined threshold, e.g. 10 dB. Each entry of the AP list consists of the MAC address and signal strength. The AP list is sent to the server 240 via the network 230 for use in generating the nearby friend list.

Figure 13A:
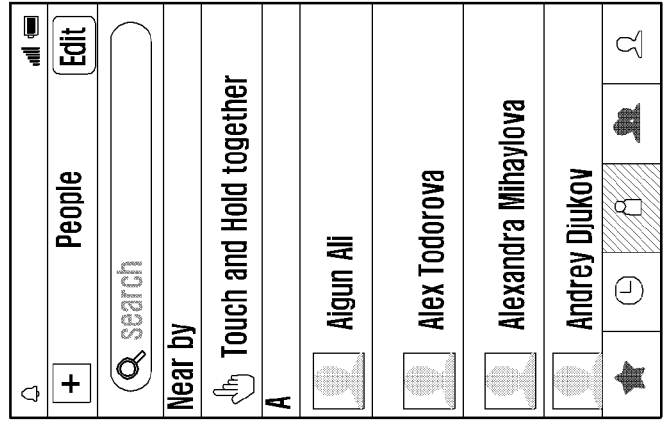
FIG. 13A, FIG. 13B, FIG. 13C, FIG. 13D, and FIG. 13E are diagrams illustrating an example of screen displays of the UI of the phonebook application of the terminal.
Figure 13B:
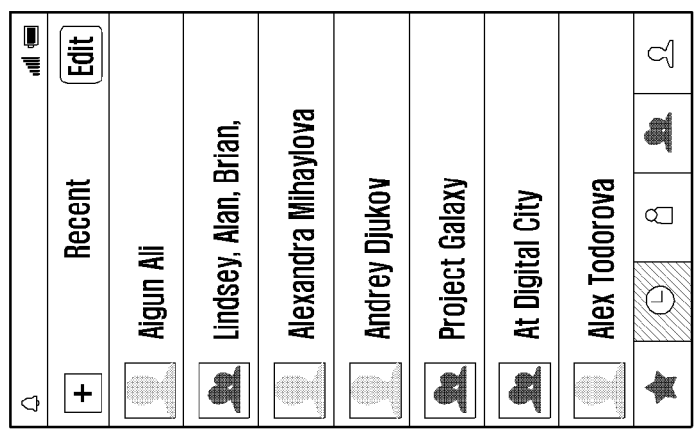
Figure 13C:
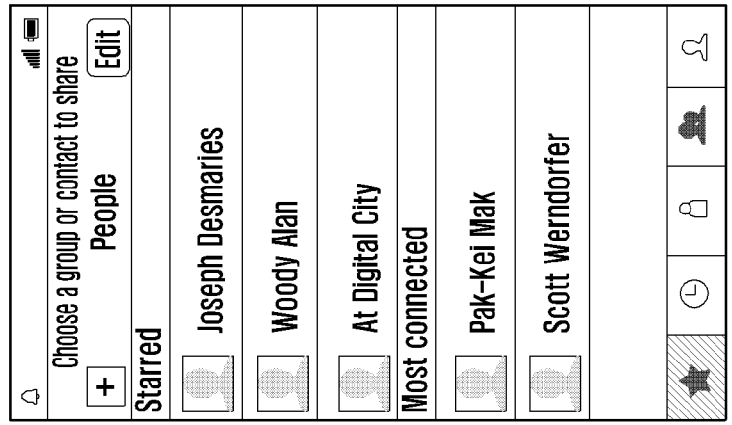

FIG. 12 is a diagram illustrating an example of the information structure of a phonebook application of the mobile terminal according to an aspect of the present disclosure. FIGS. 13A to 13E are diagrams illustrating exemplary screen displays of the UI of the phonebook application of the terminal. FIG. 14 is a diagram illustrating an exemplary UI of the phonebook application for providing the user profile according to an aspect of the present disclosure. Referring to FIGS. 12, 13A to 13E, and 14, the "Favorite" folder contains the contact/group used most frequently. FIG. 13A shows an exemplary favorite list UI of the phonebook application according to an aspect of the present disclosure.

Referring to FIG. 13A, the contact/group "starred" added manually and the most recently used contact/group are classified into "most connected" registered automatically by the control unit 150 of the mobile terminal 100.

The "Recent" folder of FIG. 12 includes the recently contacted People/Group. FIG. 13B shows the "Recent" folder UI of the phonebook application. Referring to FIG. 13B, the "Recent" folder presents the names of the subscribers corresponding to the recently contacted phone numbers.

The "People (contact)" folder of FIG. 12 includes search, nearby, and people items. The "People" item indicates the information on the user registered with the phone book and is represented by name. If the "People" folder is opened, the UI having a search box at the top is displayed as shown in FIG. 13C. The search box is used to receive the phone number or a name to search for the target phone number or user. Below the search box, a nearby friend discovery region is presented. By making a gesture, e.g. a long tap onto the "Touch and Hold Together" item arranged below "Nearby", it is possible to discover the mobile terminal corresponding to the nearby friend. Below the title "Nearby", the names of the users registered with the People list of FIG. 12 are listed. If a touch gesture is made onto a name, the information on the user corresponding to the name and, if necessary, it is possible to send a message, place a voice or video call, or share file, folder, playlist, map, or application. The "Group" folder of FIG. 12 includes search, social group, local group, and instant group items. The search item makes it possible to search for the phone numbers or users belonging to the group. The search may be performed based on a user name or phone number, for example.

The social group item of the group folder includes SNS groups such as Facebook and Twitter groups making it possible for the subscribers to interwork. The Social Group establishes the friend relationship among the subscriber through an invitation/acceptance process.

The local group of the group folder includes the users selected based on criteria set by the user among the subscribers registered with the phonebook that are linked to the phone numbers.

The instant group of the group folder is includes users with whom communications are conducted frequently. If necessary, the user may assign a group name to the Instant group to change to a local group.

Figure 13D:
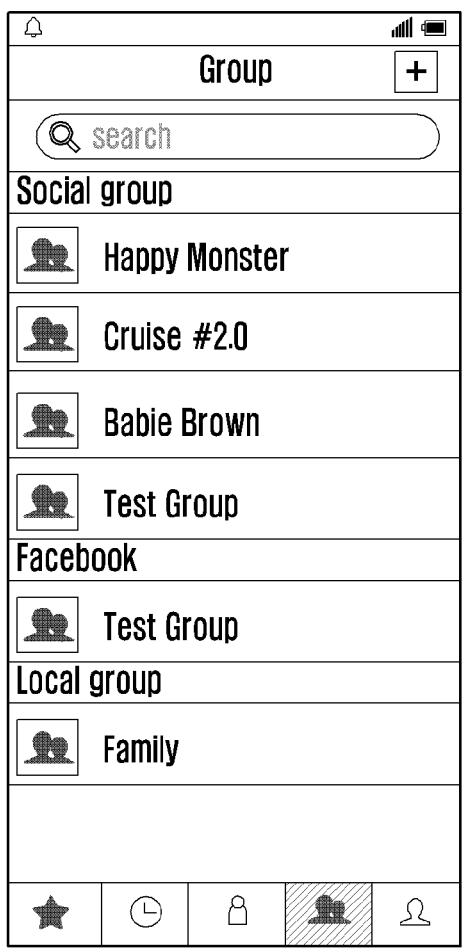
Figure 14:
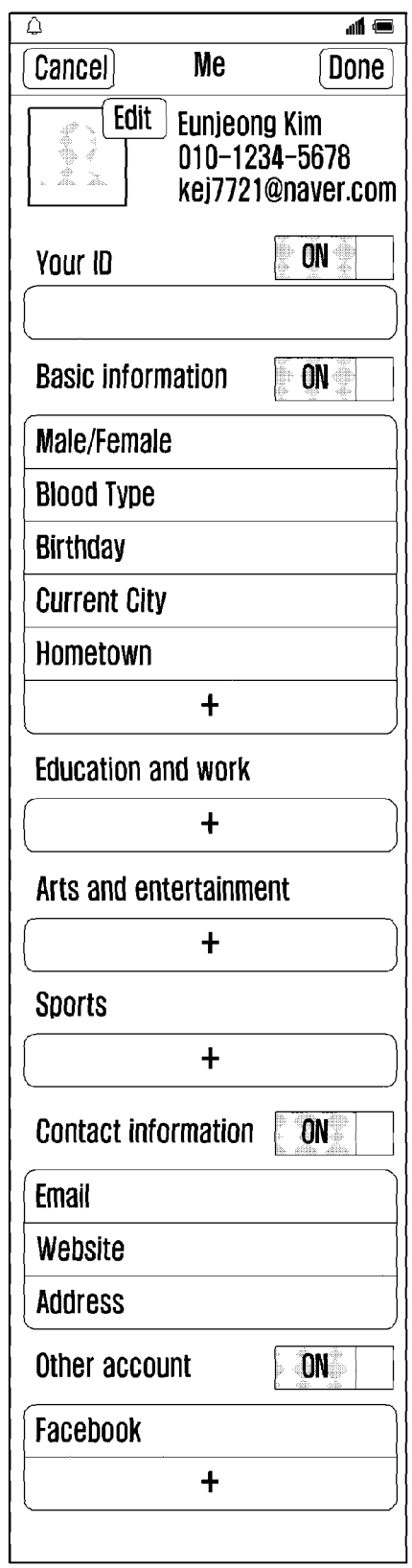
FIG. 14 is a diagram illustrating an example of a UI of the phonebook application for providing the user profile according to an aspect of the present disclosure.

FIG. 13D shows a group folder UI of the phonebook application according to an aspect of the present disclosure. Referring to FIG. 13D, the group folder UI includes a search box at the top, a social group section below the search box, and a Facebook group as a representative social group below the social group section. Although not depicted, the Instant group section may also be displayed.

Figure 13E:

The Me profile folder of FIG. 12 includes Basic Info, Accounts, and Interests items. The "Basic info" item is provided with an on/off switch in order for the user to allow other users to access the user profile. When the switch is set to ON, other users are allowed to access the user's information. Otherwise, when the switch is set to OFF, other users may not be permitted to access the profile. The phone number, email address, and SNS ID are input through authentication process for use in establishing a friend relationship. If the Me profile of FIG. 12 is executed, the UI screen is displayed as shown in FIG. 13E which includes an Edit item. If the edit item is selected, the execution screen is displayed as shown in FIG. 14 which includes the name, phone number, and email address of the user right below the screen title and an on/off switch for configuration of whether to share the information with friends. The basic information section of the exemplary screens of FIGS. 13E and 14 includes the basic information on the user such as sex (male/female), blood type, birthday, and resident, along with the on/off switch configuring whether to share the information with other users (e.g. friends).

The "Accounts" item is provided for managing accounts such as email account and SNS account, and the transmission/reception per account may be controls by means of an on/off switch. For example, if the on/off switch is turned on, it is possible to transmit/receive message through the email and SNS accounts. Otherwise if the on/off switch is turned off, it is impossible to transmit/receive message through the email and SNS accounts. Although not depicted in FIG. 13e, it is possible to turn on/off the accounts on the screen of FIG. 13E.

The "interests" item is provided for sharing information about the users hobbies or interests. Referring to FIG. 14, the user may register a hobby and information thereon and share it with others. The hobby may be registered in the form of Education and work or Arts and entertainment along with the brief information thereon, e.g. picture. It is also possible to add multiple hobbies.

The "Contact information" section of FIG. 14 is provided with an on/off switch. The on/off switch may permit the user to specify at least one of: whether to allow for email, website, and address access, whether to allow for message transmission/reception, and whether to push the AP list at a regular interval.

The AP list built for use in nearby friend discovery according to an aspect of the present disclosure may be pushed to the server 240 at a predetermined interval or transmitted to the server 240 when the terminal connects to the Internet according to the configuration. For example, if the switch provided for the Contact information is turned on, the AP list is pushed at an interval automatically and, otherwise the switch is turned off, transmitted at the time when connecting to the Internet or in the progress of call processing.

Figure 15:
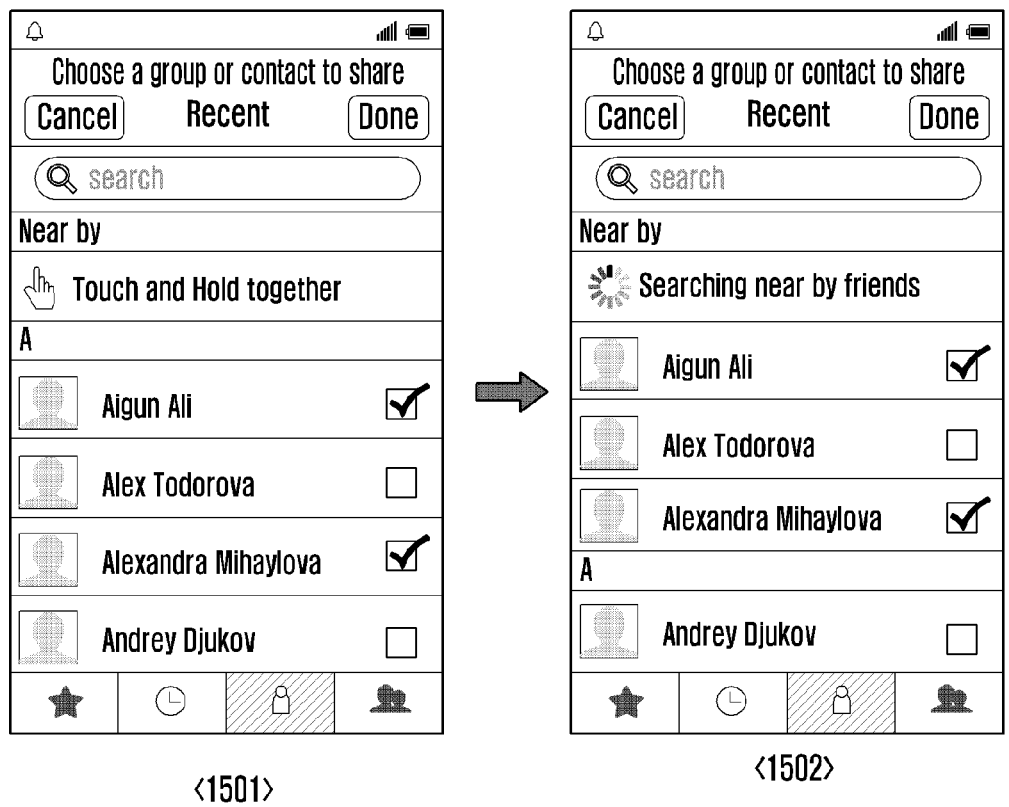
FIG. 15 is a diagram illustrating an example of screen displays of the nearby friend discovery UI according to an aspect of the present disclosure.

FIG. 15 is a diagram illustrating exemplary screen displays of the nearby friend discovery UI according to an aspect of the present disclosure. Referring to FIG. 15, a hand-shape icon is presented along a text of "Touch and Hold Together" on which the user may make a touch input gesture to request for performing the nearby friend discovery. In response to this request, the mobile terminal scans around to discover adjacent APs 220 to 225 and generates an AP table sorted in the order of signal strength or signal reception time.

The control unit 150 generates an AP list with the MAC addresses and signal strengths selected from the AP table and sends the AP list to the server 240 via the network 230. The AP list is transmitted when the mobile terminal connects to the Internet or periodically in a push mode. The server 240 determines whether there is the subscribers having the same AP MAC address and references the friend relationship DB 241 to determine whether the subscribers having the same AP MAC address are friends and sends the nearby friend list generated based on the determination result to the mobile terminal such that the user of the mobile terminal recognizes the presence of the nearby friend. At this time, check boxes are provided along with the entries, i.e. friend names. Using the check boxes, it is possible to sends a group SMS or individual SMS to the nearby friends selectively. This makes it possible to share files, folders, playlists, map, and application. The exemplary screen display 1502 shows that Aigun Ali, Alex Todorova, and Alexandra Mihaylova are discovered as nearby friends.

Figure 16:
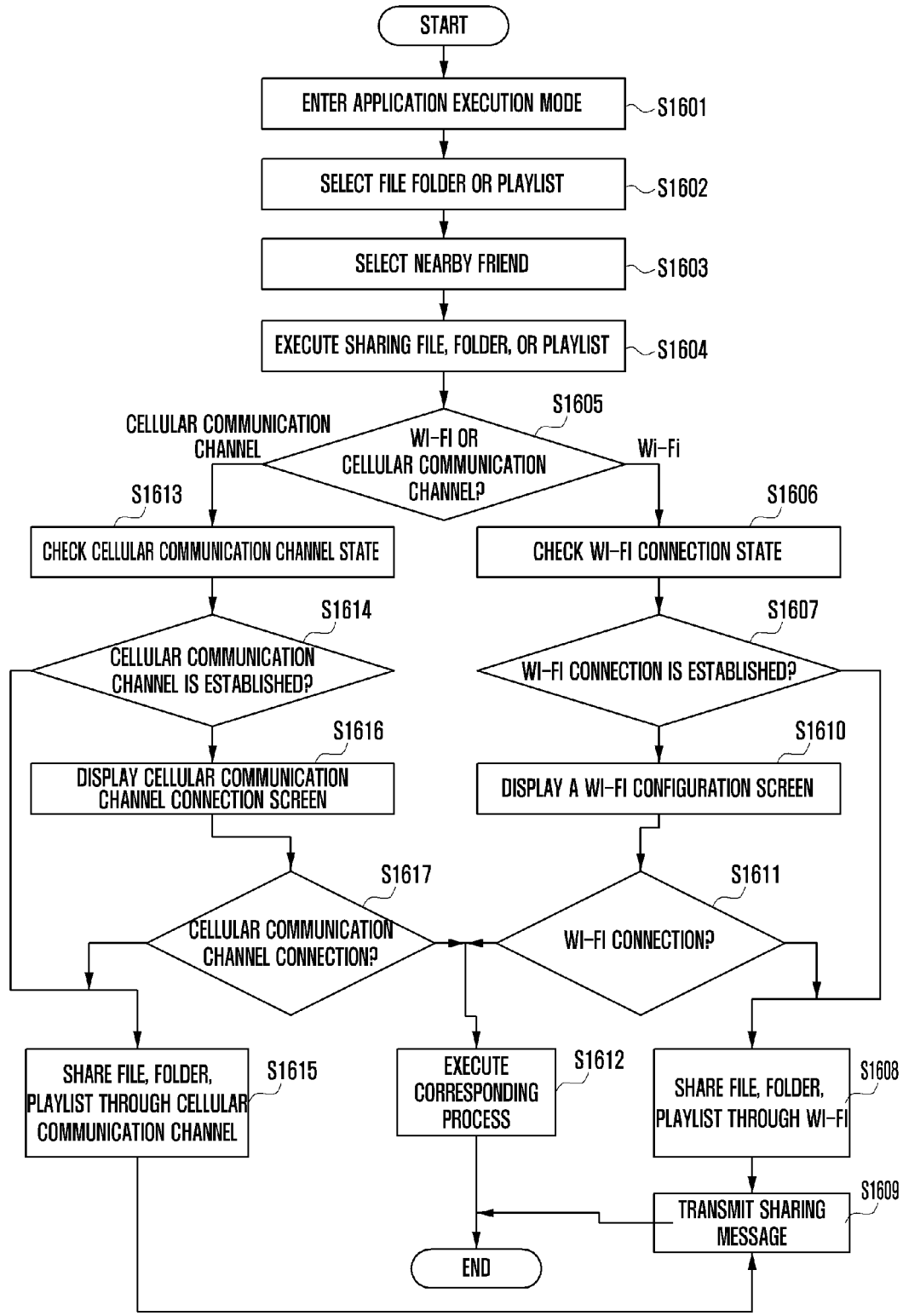
FIG. 16 is a flowchart illustrating an example of a procedure for sharing files, folders, maps, playlists, and applications with the nearby friends according to an aspect of the present disclosure.
Figure 17:
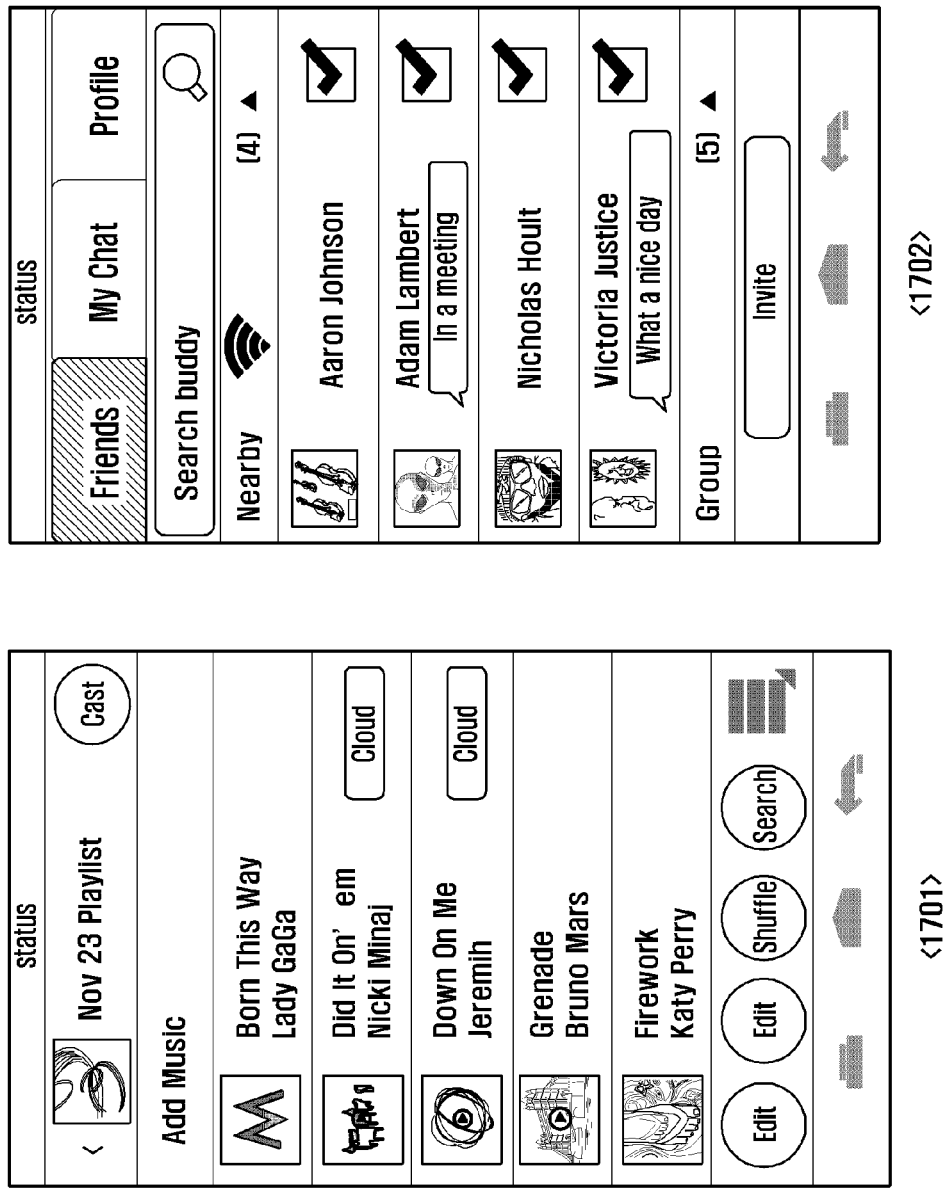
FIG. 17 is a diagram illustrating an example of screen displays of UI of casting a playlist to nearby friends in the procedure of FIG. 16.

FIG. 16 is a flowchart illustrating an example of a procedure of sharing files, folders, maps, playlists, and applications with the nearby friends according to an aspect of the present disclosure. FIG. 16 is directed to an exemplary procedure executed in the first mobile terminal 100. The control unit 150 controls the mobile terminal 100 to enter the application execution mode at operation S1610. For example, a UI for casting a playlist to a nearby friend is displayed as shown in FIG. 17, and a music play application may be executed with the execution screen as denoted by reference number 1701 of FIG. 17. The user selects any of file, folder, map, playlist, and/or application at operation S1602. Referring to FIG. 17, the user may select the playlist entitled Nov 23 Playlist to play music. At this time, the playlist may be composed with the local files stored in the mobile terminal and the cloud.

The user of the first mobile terminal 100 discovers the nearby mobile terminals 102 and 104 and selects the nearby friends to share the file, folder, map, playlist, and/or application with, at operation S1603. The user of the first mobile terminal 100 executes sharing the file, folder, application, playlist, and/or application with the selected nearby friends at operation S1604. For example, if an invitation button is clicked, it starts to share the file, folder, map, playlist, and/or application.

The file sharing may be performed through a wireless channel. The control unit 150 inquires whether to perform sharing through a cellular communication channel or a short range wireless communication channel such as Wi-Fi.

The user selects one of the Wi-Fi and the cellular communication networks, at operation 1605. If the user of the mobile terminal 100 selects the Wi-Fi network, the control unit 150 checks the Wi-Fi connection state at operation S1606. The control unit 150 determines whether the mobile terminal is in the state of being connected to the Wi-Fi network at operation S1607. If the mobile terminal is in the state of being connected to the Wi-Fi network, the control unit 150 controls to share the file, folder, or playlist through Wi-Fi channel established via the AP at operation S1608. The control unit 150 sends a message notifying of sharing at least one of the file, folder, and playlist to the nearby friends selected for file sharing at operation 1609.

If the mobile terminal has not been connected to the Wi-Fi network at operation S1608, the control unit 150 controls to display a Wi-Fi configuration screen at operation S1610. The control unit 150 determines whether a Wi-Fi connection is established in response to the user request at operation S1611 and, if a Wi-Fi connection is established successfully, the procedure goes to operation S1608. If it fails to establish Wi-Fi connection at operation S1611, the control unit 160 performs the corresponding process at operation S1612. The corresponding process may be of terminating Wi-Fi connection attempt or returning the procedure to the operation S1605.

Meanwhile, the control unit 150 inquires whether to use the cellular communication network or wireless local area network such as Wi-Fi at operation S1605 and checks, if the cellular communication network is selected, the cellular communication network connection state at operation S1613. The control unit 150 determines whether the mobile terminal is in the state of being connected to the cellular communication network at operation S1614. If the mobile terminal is in the state of being connected to the cellular communication network, the control unit 150 performs sharing of the file, folder, map, playlist, and/or application through the cellular communication network at operation S1615.

If the mobile terminal has not been connected to the cellular communication network at operation S1614, the control unit 150 displays a cellular communication network connection configuration screen at operation S1616. The control unit 150 determines whether the mobile terminal 100 has established a cellular communication channel successfully at operation S1617. If the mobile terminal has established a cellular communication channel successfully, the procedure goes to operation S1615. Otherwise if the mobile terminal has failed establishing a cellular communication channel, the control unit 150 performs a corresponding process at operation S1612. The corresponding process may be of terminating cellular communication network connection attempt or returning the procedure to the operation S1605.

Figure 18:
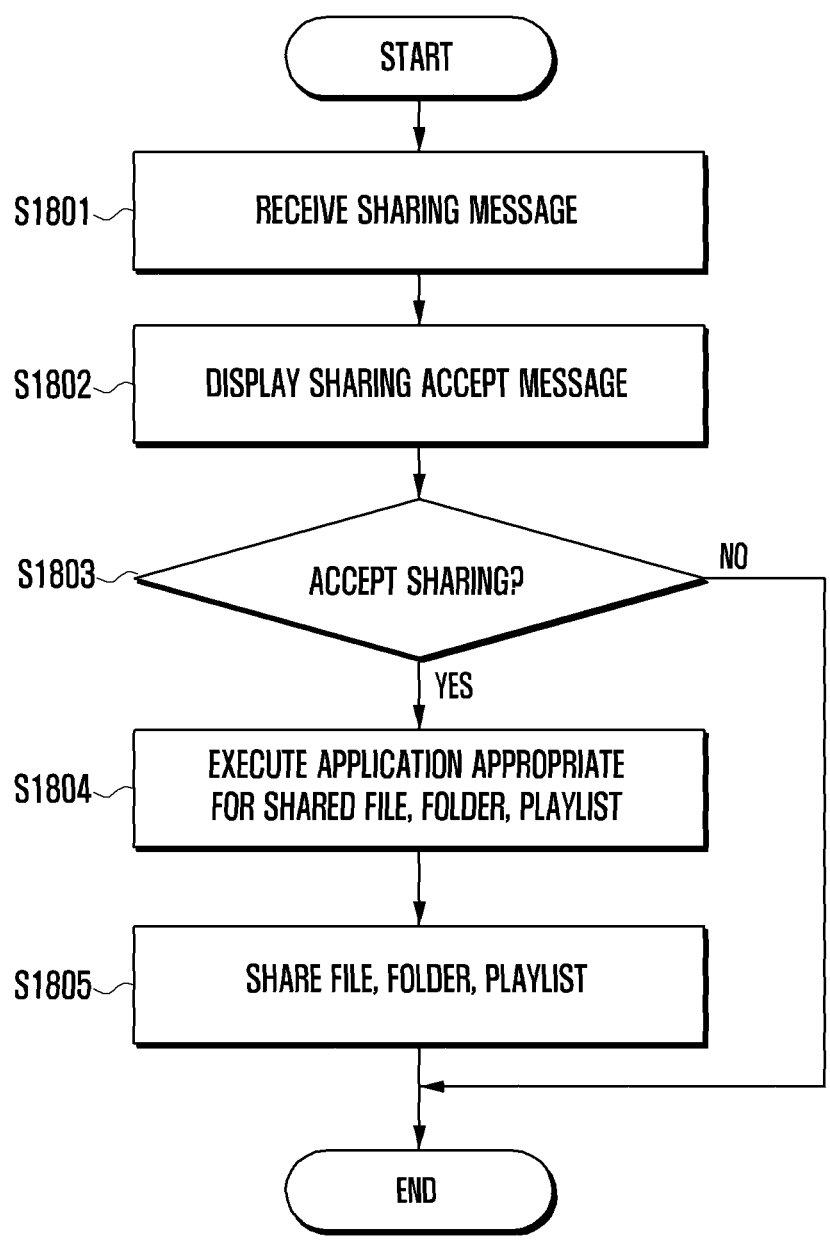
FIG. 18 is a flowchart illustrating an example of a procedure of the mobile terminal in response of the receipt of a sharing message according to an aspect of the present disclosure.

FIG. 18 is a flowchart illustrating an example of a sharing procedure of the mobile terminal in response to the receipt of a sharing message according to an aspect of the present disclosure. The example of FIG. 18 is directed to the operation of the mobile terminal of the nearby friend, particularly the second mobile terminal 102. The second mobile terminal 102 receives a sharing message from the first mobile terminal 100 at operation S1801. The second mobile terminal 102 displays a message inquiring whether to accept sharing. The nearby mobile terminal displays a sharing message reception notification UI at operation S1802 as shown in FIG. 19 in which the reference number 1901 denotes an exemplary notification message prompting the user to determine whether to join or ignore the invitation to the music casting of the first mobile terminal 100.

The second mobile terminal 102 determines whether the user accepts or rejects sharing of file, folder, map, playlist, and/or application at operation S1803.

If it is determined that the user accepts sharing the file, folder, map, playlist, and/or application at operation S1803, the second mobile terminal 102 executes an application appropriate for the file, folder, map, playlist, and/or application at operation S1804. The second mobile terminal 102 shares the file, folder, map, playlist, and application by means of the executed application at operation S1805. The second mobile terminal 1805 displays the users of the instant group as the group of nearby friends sharing the files at operation S1805.

Figure 19:
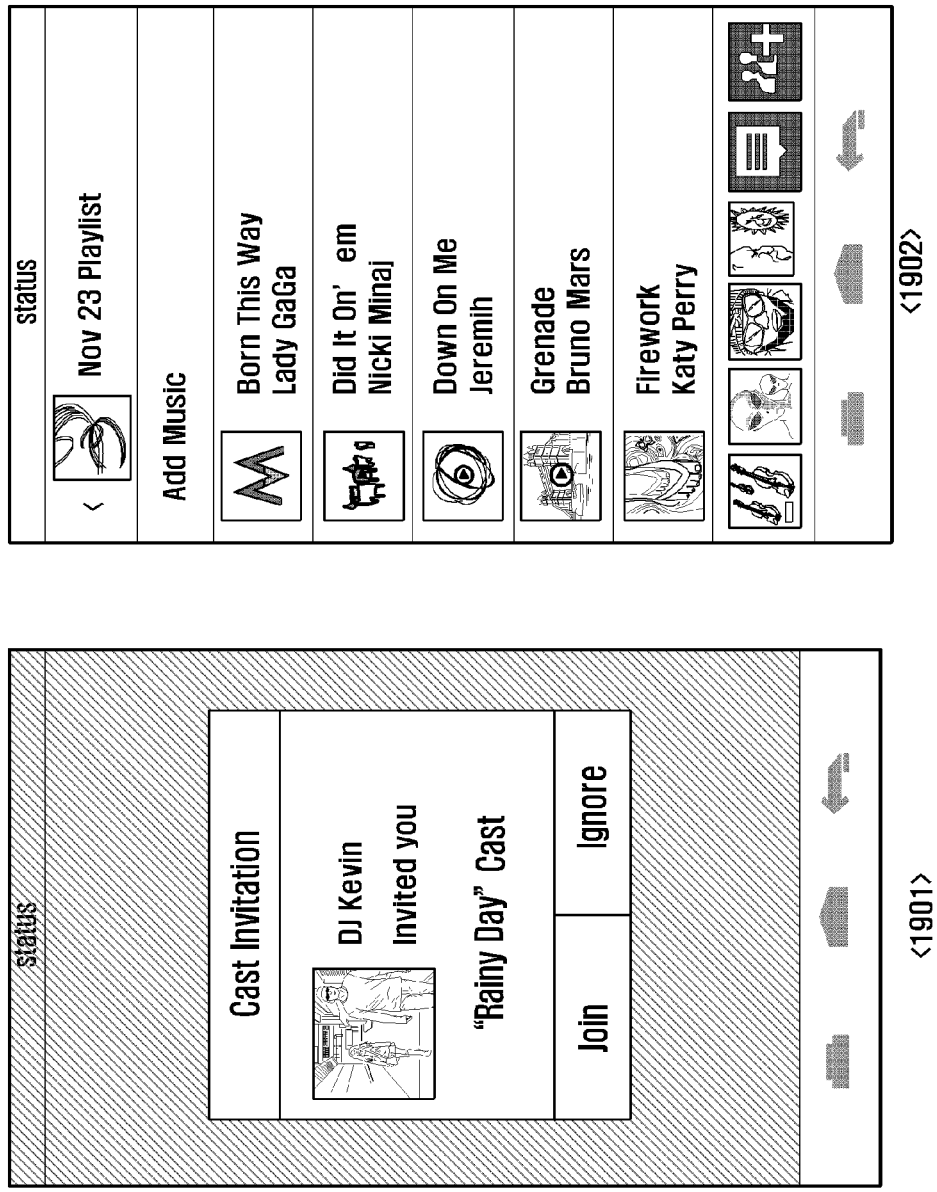
FIG. 19 is a diagram illustrating an example of screen displays of UI of receiving a sharing message at the nearby mobile terminal in the procedure of FIG. 18.

Referring to FIG. 19, the playlist displayed on the exemplary screen 1902 of the second mobile terminal 102 of one of the nearby friends is identical with the playlist displayed on the exemplary screen 1701 of the first mobile terminal 100. Meanwhile, the instant group of users sharing the playlist is presented at the bottom of the playlist on the exemplary screen 1902.

The nearby friend discovery method and system of the present disclosure is capable of discovering nearby registered terminals and sending data to the discovered terminal, resulting in improvement of terminal usability.

Also, the nearby friend discovery method and system of the present disclosure is capable of discovering nearby friends based on the signal strength of an AP without actual connection thereto, thereby notifying the user of the nearby presence cost-effectively.

Also, the nearby friend discovery method and system of the present disclosure is capable of checking a nearby friend and sending data to the discovered friend using an intuitive User Interface (UI).

Also, the nearby friend discovery method and system of the present disclosure is advantageous in using the legacy local area communication mechanism without any modification by allowing a server to compute the proximity and relationship of the mobile terminal.

Although the access point-based nearby friend discovery methods according to aspects of the disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

FIGS. 1-19 are provided as an example only. At least some of the operations discussed with respect to those figures may be performed in a different order, performed concurrently, or altogether omitted. Although the above examples are provided with respect to portable terminals, it will be understood that the techniques disclosed herein can be implemented on non-portable devices, such as desktop computers.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

What is claimed is:

1. A nearby friend discovery method comprising:
   displaying a first screen of contact list comprising a first contact entry and an indication of nearby friend discovery;
   receiving an input selecting the indication of nearby friend discovery;
   generating, by an electronic device, in response to the received input, an access point (AP) list identifying one or more access points (APs), the AP list being generated based on a strength of signals received from the access points;
   transmitting the AP list from the electronic device to a server;
   receiving, by the electronic device from the server, a user list, the user list including an indication of one or more users of an external device having another AP list including at least one AP among the APs included in the AP list and who have previously exchanged one or more communications with a user of the electronic device;
   displaying, after receiving the user list from the server, a second screen of the contact list comprising a second contact entry and the indication of nearby friend discovery followed by a nearby friend list;
   in response to user selection of at least one user in the second screen, displaying a third screen to select, by a user of the electronic device, one of communication networks, wherein the communication networks include an AP existing in both the AP list and an AP list corresponding to the selected user and cellular communication service; and
   transmit data to the external device corresponding to the selected user based on the selected cellular communication service,
   wherein the nearby friend list comprises a contact entry matched with both the first contact entry and the user list.

2. The method of claim 1, wherein the generating of the AP list comprises including in the AP list only identifiers of access points having a signal strength that is greater than a threshold.

3. The method of claim 1, wherein:
   the user list is generated based on a relationship database (DB) including a plurality of user profiles;
   each user profile comprises static field information and dynamic field information;
   the static field information comprises at least one of Social Network Service (SNS) address book, phonebook, and email address book; and
   the dynamic field information comprises the AP list.

4. The method of claim 3, wherein:
   the relationship DB includes a profile for the user of the electronic device; and
   the static field information in the profile for the user of the electronic device is generated based on at least one of a phonebook, a social networking service (SNS) address book, and an email address book that is stored in the electronic device.

5. The method of claim 3, wherein the one or more users in the user list include users who are identified in the at least one of the phonebook, the SNS address book, and the email address book that is stored in the electronic device.

6. The method of claim 3, further comprising modifying, by the electronic device, the relationship DB.

7. A mobile terminal comprising:
   a touch screen;
   a communication unit; and
   a controller configured to:
   control the touch screen to display a first screen of contact list comprising a first contact entry and an indication of nearby friend discovery,
   control the touch screen to receive an input selecting the indication of nearby friend discovery,
   generate, in response to the received input, an access point (AP) list identifying one or more access points (APs), the AP list being generated based on a strength of signals received from the access points,
   control the communication unit to transmit the AP list from the mobile terminal to a server,
   control the communication unit to receive a user list from the server, the user list including an indication of one or more users of an external device having another AP list including at least one AP among the APs included in the AP list and who have previously exchanged one or more communications with a user of the mobile terminal, control, after receiving the user list from the server, the touch screen to display a second screen of the contact list comprising a second contact entry and the indication of nearby friend discovery followed by a nearby friend list, control, in response to user selection of at least one user in the second screen, the touch screen to display a third screen to select one of communication networks, wherein the communication networks include an AP existing in both the AP list and an AP list corresponding to the selected user and cellular communication service, and control the communication unit to transmit data to the external device corresponding to the selected user based on the selected cellular communication service, wherein the nearby friend list comprises a contact entry matched with both the first contact entry and the user list.

8. The mobile terminal of claim 7, wherein the controller is further configured to generate the AP list including only identifiers of access points having a signal strength that is greater than a threshold.

9. The mobile terminal of claim 7, wherein:
the user list is generated based on a relationship database (DB) including a plurality of user profiles;
each user profile comprises static field information and dynamic field information;
the static field information comprises at least one of Social Network Service (SNS) address book, phonebook, and email address book; and
the dynamic field information comprises the AP list.

10. The mobile terminal of claim 9, wherein:
the relationship DB includes a profile for the user of the mobile terminal; and
the static field information in the profile for the user of the mobile terminal is generated based on at least one of a phonebook, a social networking service (SNS) address book, and an email address book that is stored in the mobile terminal.

11. The mobile terminal of claim 9, wherein the one or more users in the user list include users who are identified in the at least one of the phonebook, the SNS address book, and the email address book that is stored in the mobile terminal.

* * * * *